(12) United States Patent
Liu et al.

(10) Patent No.: US 12,370,479 B2
(45) Date of Patent: Jul. 29, 2025

(54) HONEYCOMB BODY WITH POROUS MATERIAL

(71) Applicant: CORNING INCORPORATED, Corning, NY (US)

(72) Inventors: Cai Liu, Suzhou (CN); Dale Robert Powers, Painted Post, NY (US); Jianguo Wang, Cape Coral, FL (US); Huiqing Wu, Shanghai (CN); Xinfeng Xing, Shanghai (CN)

(73) Assignee: CORNING INCORPORATED, Corning, NY (US)

( * ) Notice: Subject to any disclaimer, the term of this patent is extended or adjusted under 35 U.S.C. 154(b) by 325 days.

(21) Appl. No.: 17/273,064

(22) PCT Filed: Sep. 3, 2018

(86) PCT No.: PCT/CN2018/103807
§ 371 (c)(1),
(2) Date: Mar. 3, 2021

(87) PCT Pub. No.: WO2020/047708
PCT Pub. Date: Mar. 12, 2020

(65) Prior Publication Data
US 2021/0205750 A1    Jul. 8, 2021

(51) Int. Cl.
*B01D 46/24*    (2006.01)
*B01D 39/20*    (2006.01)

(52) U.S. Cl.
CPC ..... *B01D 39/2079* (2013.01); *B01D 46/2429* (2013.01); *B01D 46/24491* (2021.08);
(Continued)

(58) Field of Classification Search
CPC ............ B01D 46/2429; B01D 46/2474; B01D 46/24491; B01D 46/24492; B01D 39/2079
(Continued)

(56) References Cited

U.S. PATENT DOCUMENTS 6,840,976 B2   1/2005   Vance et al.
6,890,616 B2   5/2005   Suwabe et al.
(Continued)

FOREIGN PATENT DOCUMENTS

CN    1365298 A    8/2002
CN    1424493 A    6/2003
(Continued)

OTHER PUBLICATIONS

Hanft et al., "An overview of the aerosol deposition method process: fundamentals and new trends in materials applications", J. Ceram. Sci. Tech., vol. 6, No. 3, pp. 147-182.
(Continued)

*Primary Examiner* — Qianping He
(74) *Attorney, Agent, or Firm* — Kevin M. Able; Joseph M. Homa

(57) ABSTRACT

A honeycomb body (100) having a porous ceramic honeycomb structure with a first end (105), a second end (135), and a plurality of walls (115) having wall surfaces defining a plurality of inner channels (110). A porous material is disposed on one or more of the wall surfaces of the honeycomb body (100). A method for forming a honeycomb body (100) includes depositing a porous inorganic material on a ceramic honeycomb body (100) and binding the porous inorganic material to the ceramic honeycomb body (100) to form the porous layer.

19 Claims, 21 Drawing Sheets

(52) U.S. Cl.
CPC ... *B01D 46/24492* (2021.08); *B01D 46/2474* (2013.01); *B01D 46/2482* (2021.08)

(58) Field of Classification Search
USPC .......................................................... 55/523
See application file for complete search history.

(56) References Cited

U.S. PATENT DOCUMENTS

| | | | |
|---|---|---|---|
| 7,520,918 | B2 | 4/2009 | Zoeller, III |
| 7,704,296 | B2 | 4/2010 | Merkel |
| 7,767,256 | B2 | 8/2010 | Gu et al. |
| 8,012,439 | B2 | 9/2011 | Arnold et al. |
| 8,298,311 | B2 | 10/2012 | Chen et al. |
| 8,475,557 | B2 | 7/2013 | Boger et al. |
| 8,495,968 | B2 | 7/2013 | Tsuji et al. |
| 8,534,221 | B2 | 9/2013 | Tsuji et al. |
| 8,632,852 | B2 | 1/2014 | Tsuji et al. |
| 8,894,895 | B2 | 11/2014 | Fredholm et al. |
| 8,959,773 | B2 | 2/2015 | Fekety et al. |
| 9,040,003 | B2 | 5/2015 | Andersen et al. |
| 9,255,036 | B2 | 2/2016 | Drury et al. |
| 9,321,694 | B2 | 4/2016 | Pyzik et al. |
| 9,352,277 | B2 | 5/2016 | Sutton et al. |
| 9,523,623 | B2 | 12/2016 | Blanchard et al. |
| 9,656,421 | B2 | 5/2017 | Chaumonnot et al. |
| 10,752,997 | B2 | 8/2020 | Jiang |
| 2003/0024219 | A1 | 2/2003 | Harada et al. |
| 2003/0167755 | A1 | 9/2003 | Nakatani et al. |
| 2004/0176246 | A1 | 9/2004 | Shirk et al. |
| 2005/0180898 | A1 | 8/2005 | Yamada |
| 2010/0126133 | A1* | 5/2010 | Fekety .................... F01N 3/035 427/372.2 |
| 2010/0158774 | A1 | 6/2010 | Andy et al. |
| 2012/0070346 | A1 | 3/2012 | Mizutani et al. |
| 2012/0134891 | A1* | 5/2012 | Boger .................. B01D 46/2429 422/211 |
| 2013/0149458 | A1* | 6/2013 | Cai .......................... C04B 41/87 427/140 |
| 2014/0248464 | A1 | 9/2014 | Soga |
| 2014/0272276 | A1 | 9/2014 | Drury et al. |
| 2015/0017075 | A1 | 1/2015 | Jinbo et al. |
| 2016/0272547 | A1 | 9/2016 | Kikuchi et al. |
| 2016/0288449 | A1* | 10/2016 | Ouchi ..................... C04B 35/565 |
| 2018/0311621 | A1 | 11/2018 | Chen et al. |
| 2018/0361299 | A1 | 12/2018 | Ingram-Ogunwumi et al. |
| 2020/0353401 | A1 | 11/2020 | Beall et al. |

FOREIGN PATENT DOCUMENTS

| | | |
|---|---|---|
| CN | 1464936 A | 12/2003 |
| CN | 1512972 A | 7/2004 |
| CN | 1646204 A | 7/2005 |
| CN | 1984854 A | 6/2007 |
| CN | 101311501 A | 11/2008 |
| CN | 101558024 A | 10/2009 |
| CN | 101563170 A | 10/2009 |
| CN | 101679135 A | 3/2010 |
| CN | 101970377 A | 2/2011 |
| CN | 102413906 A | 4/2012 |
| CN | 102762279 A | 10/2012 |
| CN | 103080047 A | 5/2013 |
| CN | 103270002 A | 8/2013 |
| CN | 103459012 A | 12/2013 |
| CN | 103796758 A | 5/2014 |
| CN | 103889928 A | 6/2014 |
| CN | 104768643 A | 7/2015 |
| CN | 104801114 A | 7/2015 |
| CN | 105408731 A | 3/2016 |
| CN | 105503232 A | 4/2016 |
| CN | 105793212 A | 7/2016 |
| CN | 108290102 A | 7/2018 |
| CN | 108367225 A | 8/2018 |
| EP | 1775021 A1 | 4/2007 |
| EP | 1775022 A1 | 4/2007 |
| EP | 2158956 A1 | 3/2010 |
| JP | 07-330456 A | 12/1995 |
| JP | 2010-529343 A | 8/2010 |
| JP | 2012-509764 A | 4/2012 |
| JP | 2013-542902 A | 11/2013 |
| JP | 2014-117663 A | 6/2014 |
| JP | 2015-034322 A | 2/2015 |
| WO | 2004/007499 A1 | 1/2004 |
| WO | 2009/101683 A1 | 8/2009 |
| WO | 2017/075328 A1 | 5/2017 |
| WO | 2020/047503 A2 | 3/2020 |
| WO | 2020/047506 A1 | 3/2020 |

OTHER PUBLICATIONS

Konstandopoulos et al., "Microstructural Properties of Soot Deposit in Diesel Particulate Traps", In SAE World Congress & Exhibition, 2002, 11 pages.
Tandon et al., "Measurement and prediction of filtration efficiency evolution of soot loaded diesel particulate filters", Chemical Engineering Science vol. 65, Issue 16, Aug. 15, 2010, pp. 4751-4760.
International Search Report and Written Opinion of the International Searching Authority; PCT/CN2018/103807; Mailed May 30, 2019; 9 Pages; National Intellectual Property.
International Search Report and Written Opinion of the International Searching Authority; PCT/US19/49209; Mailed Feb. 28, 2020; 22 Pages; European Patent Office.
Japanese Patent Application No. 2021-536124, Office Action, dated Aug. 3, 2022, 10 pages (5 pages of English Translation and 5 pages of Original Copy); Japanese Patent Office.
C. U. Ingemar, et al., "Dealuminated mordenites as catalyst in the oxidation and decomposition of nitric oxide and in the decomposition of nitrogen dioxide: characterization and activities", Catalysis Today, Jan. 1989, pp. 155-172.
Chinese Patent Application No. 201880099198.X, Office Action dated May 10, 2022, 7 pages (English Translation Only), Chinese Patent Office.
Chinese Patent Application No. 201980072251.1, Office Action, dated Apr. 28, 2022, 5 pages, Chinese Patent Office.
European Patent Application No. 19769665.1, Observations by third parties, dated Jul. 5, 2022; 5 pages; European Patent Office.
R. M. Heck, et al., Catalytic Air Pollution Control, Commercial Technology, John Wiley & Sons 3rd Edition, 2009.

\* cited by examiner

```
Solution Preparation
        ↓
     Atomizing
        ↓
  Aggregate Drying
        ↓
 Material Deposition
        ↓
    Binder Curing
```

FIG. 5

| Sampling ID | Label | Area | Perim. | Circ. |
|---|---|---|---|---|
| 1 | mesh2_m001.jpg | 0.15 | 1.701 | 0.651 |
| 2 | mesh2_m001.jpg | 0.047 | 0.793 | 0.94 |
| 3 | mesh2_m001.jpg | 0.069 | 1.035 | 0.805 |
| 4 | mesh2_m001.jpg | 0.019 | 0.506 | 0.922 |
| 5 | mesh2_m001.jpg | 0.108 | 1.512 | 0.594 |
| 6 | mesh2_m001.jpg | 0.029 | 0.645 | 0.884 |
| 7 | mesh2_m001.jpg | 0.06 | 0.915 | 0.896 |
| 8 | mesh2_m001.jpg | 0.038 | 0.737 | 0.885 |
| 9 | mesh2_m001.jpg | 0.033 | 0.681 | 0.892 |
| 10 | mesh2_m001.jpg | 0.025 | 0.596 | 0.875 |
| 11 | mesh2_m001.jpg | 0.024 | 0.585 | 0.88 |
| 12 | mesh2_m001.jpg | 0.043 | 0.82 | 0.804 |
| 13 | mesh2_m001.jpg | 0.024 | 0.562 | 0.944 |
| 14 | mesh2_m001.jpg | 0.037 | 0.702 | 0.938 |
| 15 | mesh2_m001.jpg | 0.035 | 0.696 | 0.916 |
| 16 | mesh2_m001.jpg | 0.041 | 0.772 | 0.873 |
| 17 | mesh2_m001.jpg | 0.048 | 0.912 | 0.722 |
| 18 | mesh2_m001.jpg | 0.058 | 0.886 | 0.934 |
| 19 | mesh2_m001.jpg | 0.045 | 0.789 | 0.903 |
| 20 | mesh2_m001.jpg | 0.07 | 1.092 | 0.737 |
| 21 | mesh2_m001.jpg | 0.026 | 0.642 | 0.785 |
| 22 | mesh2_m001.jpg | 0.02 | 0.525 | 0.891 |
| 23 | mesh2_m001.jpg | 0.048 | 0.897 | 0.746 |
| 24 | mesh2_m001.jpg | 0.045 | 0.846 | 0.795 |
| 25 | mesh2_m001.jpg | 0.083 | 1.2 | 0.727 |
| | Mean | 0.049 | 0.842 | 0.838 |
| | SD | 0.03 | 0.29 | 0.096 |
| | Min | 0.019 | 0.506 | 0.594 |
| | Max | 0.15 | 1.701 | 0.944 |

FIG. 14B

| Sampling ID | Label | Area | Perim. | Circ. |
|---|---|---|---|---|
| 1 | 10%.jpg | 3.25 | 6.382 | 1 |
| 2 | 10%.jpg | 8.404 | 10.273 | 1 |
| 3 | 10%.jpg | 1.86 | 4.852 | 0.993 |
| 4 | 10%.jpg | 3.844 | 6.951 | 1 |
| 5 | 10%.jpg | 2.528 | 5.639 | 0.999 |
| 6 | 10%.jpg | 2.007 | 5.027 | 0.998 |
| 7 | 10%.jpg | 1.289 | 4.022 | 1 |
| 8 | 10%.jpg | 5.032 | 7.956 | 0.999 |
| 9 | 10%.jpg | 1.205 | 3.891 | 1 |
| 10 | 10%.jpg | 2.63 | 5.77 | 0.993 |
| 11 | 10%.jpg | 4.557 | 7.562 | 1 |
| 12 | 10%.jpg | 1.368 | 4.153 | 0.997 |
| 13 | 10%.jpg | 0.616 | 2.798 | 0.989 |
| 14 | 10%.jpg | 1.664 | 4.634 | 0.974 |
| 15 | 10%.jpg | 3.042 | 6.207 | 0.992 |
| 16 | 10%.jpg | 3.64 | 6.776 | 0.996 |
| 17 | 10%.jpg | 2.481 | 5.595 | 0.996 |
| 18 | 10%.jpg | 1.526 | 4.371 | 1 |
| 19 | 10%.jpg | 0.638 | 2.841 | 0.993 |
| 20 | 10%.jpg | 1.288 | 4.022 | 1 |
| 21 | 10%.jpg | 0.87 | 3.322 | 0.99 |
| 22 | 10%.jpg | 0.606 | 2.754 | 1 |
| 23 | 10%.jpg | 0.711 | 3.016 | 0.982 |
| 24 | 10%.jpg | 4.287 | 7.344 | 0.999 |
| 25 | 10%.jpg | 0.616 | 2.798 | 0.989 |
|  | Mean | 2.398 | 5.158 | 0.995 |
|  | SD | 1.833 | 1.939 | 0.007 |
|  | Min | 0.606 | 2.754 | 0.974 |
|  | Max | 8.404 | 10.273 | 1 |

FIG. 15B

HONEYCOMB BODY WITH POROUS MATERIAL

This application claims the benefit of priority under 35 U.S.C. § 365 of International Patent Application Serial No. PCT/CN2018/103807 filed on Sep. 3, 2018, the content of which is relied upon and incorporated herein by reference in its entirety.

BACKGROUND

Field

The present specification relates to articles comprising porous bodies, such as porous ceramic honeycomb bodies comprising a material such as a filtration material such as a porous material, for example, a porous inorganic layer disposed on at least a portion of the porous body, and methods for making such articles and porous bodies.

Technical Background

Wall flow filters are employed to remove particulates from fluid exhaust streams, such as from combustion engine exhaust. Examples include ceramic soot filters used to remove particulates from diesel engine exhaust gases; and gasoline particulate filters (GPF) used to remove particulates from gasoline engine exhaust gases. For wall flow filters, exhaust gas to be filtered enters inlet cells and passes through the cell walls to exit the filter via outlet channels, with the particulates being trapped on or within the inlet cell walls as the gas traverses and then exits the filter.

GPFs are used in conjunction with gasoline direct injection (GDI) engines, which emit more particulates than conventional gasoline engines. European Union emission standard for vehicles Euro 6 regulates, for example, the particulate number to be less than $6\times10^{11}$ #/km. Accumulation over time of ash cake on a GPF results in filtration efficiency (FE) improvement. Ash cake is characterized, however, by relatively low porosity of particle packing and poor durability. Accumulation of ash cake may lead to increased pressure drop across the filter, which may be detrimental to filter performance.

Initial filtration efficiency (FE) is an attribute of GPFs. There is an ongoing need to improve FE and achieve lower pressure drop.

SUMMARY

Aspects of the disclosure pertain to porous bodies and methods for their manufacture and use.

According to one aspect, a porous body comprises a porous ceramic or metal honeycomb body comprising a first end, a second end, and a plurality of porous walls having wall surfaces defining a plurality of inner channels. A material such as a filtration material such as a porous material, for example, a porous inorganic layer, is disposed on one or more of the wall surfaces. In one or more embodiments, the material such as a filtration material such as a porous inorganic layer has a porosity in a range of from about 20% to about 95%, or from about 25% to about 95%, or from about 30% to about 95%, or from about 40% to about 95%, or from about 45% to about 95%, or from about 50% to about 95%, or from about 55% to about 95%, or from about 60% to about 95%, or from about 65% to about 95%, or from about 70% to about 95%, or from about 75% to about 95%, or from about 80% to about 95%, or from about 85% to about 95%, from about 30% to about 95%, or from about 40% to about 95%, or from about 45% to about 95%, or from about 50% to about 95%, or from about 55% to about 95%, or from about 60% to about 95%, or from about 65% to about 95%, or from about 70% to about 95%, or from about 75% to about 95%, or from about 80% to about 95%, or from about 85% to about 95%, or from about 20% to about 90%, or from about 25% to about 90%, or from about 30% to about 90%, or from about 40% to about 90%, or from about 45% to about 90%, or from about 50% to about 90%, or from about 55% to about 90%, or from about 60% to about 90%, or from about 65% to about 90%, or from about 70% to about 90%, or from about 75% to about 90%, or from about 80% to about 90%, or from about 85% to about 90%, or from about 20% to about 85%, or from about 25% to about 85%, or from about 30% to about 85%, or from about 40% to about 85%, or from about 45% to about 85%, or from about 50% to about 85%, or from about 55% to about 85%, or from about 60% to about 85%, or from about 65% to about 85%, or from about 70% to about 85%, or from about 75% to about 85%, or from about 80% to about 85%, or from about 20% to about 80%, or from about 25% to about 80%, or from about 30% to about 80%, or from about 40% to about 80%, or from about 45% to about 80%, or from about 50% to about 80%, or from about 55% to about 80%, or from about 60% to about 80%, or from about 65% to about 80%, or from about 70% to about 80%, or from about 75% to about 80%, and the material such as a filtration material such as a porous inorganic layer has an average thickness of greater than or equal to 0.5 μm and less than or equal to 50 μm, or greater than or equal to 0.5 μm and less than or equal to 45 μm, greater than or equal to 0.5 μm and less than or equal to 40 μm, or greater than or equal to 0.5 μm and less than or equal to 35 μm, or greater than or equal to 0.5 μm and less than or equal to 30 μm, greater than or equal to 0.5 μm and less than or equal to 25 μm, or greater than or equal to 0.5 μm and less than or equal to 20 μm, or greater than or equal to 0.5 μm and less than or equal to 15 μm, greater than or equal to 0.5 μm and less than or equal to 10 μm.

In another aspect, a method for forming a honeycomb body comprises: contacting a material such as a filtration material with a gaseous carrier fluid; depositing the material such as a filtration material on a ceramic honeycomb body by flowing the gaseous carrier fluid through the ceramic honeycomb body; and binding the material such as a filtration material to the ceramic honeycomb body to form a porous material such as a filtration material, which may be a porous inorganic layer. The deposited materials such as a filtration material which may be a porous inorganic layer has a porosity in a range of from about 20% to about 95%, or from about 25% to about 95%, or from about 30% to about 95%, or from about 40% to about 95%, or from about 45% to about 95%, or from about 50% to about 95%, or from about 55% to about 95%, or from about 60% to about 95%, or from about 65% to about 95%, or from about 70% to about 95%, or from about 75% to about 95%, or from about 80% to about 95%, or from about 85% to about 95%, from about 30% to about 95%, or from about 40% to about 95%, or from about 45% to about 95%, or from about 50% to about 95%, or from about 55% to about 95%, or from about 60% to about 95%, or from about 65% to about 95%, or from about 70% to about 95%, or from about 75% to about 95%, or from about 80% to about 95%, or from about 85% to about 95%, or from about 20% to about 90%, or from about 25% to about 90%, or from about 30% to about 90%, or from about 40% to about 90%, or from about 45% to about 90%, or from about 50% to about 90%, or from about 55% to about 90%, or from about 60% to about 90%, or from about 65% to about 90%, or from about 70% to about 90%, or from about 75% to about 90%, or from about 80% to about 90%, or from about 85% to about 90%, or from about 20% to about 85%, or from about 25% to about 85%, or from about 30% to about 85%, or from about 40% to about 85%, or from about 45% to about 85%, or from about 50% to about 85%, or from about 55% to about 85%, or from about 60% to about 85%, or from about 65% to about 85%, or from about 70% to about 85%, or from about 75% to about 85%, or from about 80% to about 85%, or from about 20% to about 80%, or from about 25% to about 80%, or from about 30% to about 80%, or from about 40% to about 80%, or from about 45% to about 80%, or from about 50% to about 80%, or from about 55% to about 80%, or from about 60% to about 80%, or from about 65% to about 80%, or from about 70% to about 80%, or from about 75% to about 80%, and the deposited material such as a filtration material, which may be a porous inorganic layer that has an average thickness of greater than or equal to 0.5 µm and less than or equal to 50 µm, or greater than or equal to 0.5 µm and less than or equal to 45 µm, greater than or equal to 0.5 µm and less than or equal to 40 µm, or greater than or equal to 0.5 µm and less than or equal to 35 µm, or greater than or equal to 0.5 µm and less than or equal to 30 µm, greater than or equal to 0.5 µm and less than or equal to 25 µm, or greater than or equal to 0.5 µm and less than or equal to 20 µm, or greater than or equal to 0.5 µm and less than or equal to 15 µm, greater than or equal to 0.5 µm and less than or equal to 10 µm.

Additional features and advantages will be set forth in the detailed description, which follows, and in part will be readily apparent to those skilled in the art from that description or recognized by practicing the embodiments described herein, comprising the detailed description, which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 5 is a flowchart depicting an exemplary embodiment of a process of forming material which may be a porous inorganic layer according to embodiments disclosed herein;

FIG. 14B is a tabulation of the data from FIG. 14A;

FIG. 15B is a tabulation of the data from FIG. 15A.

DETAILED DESCRIPTION

Figure 1:
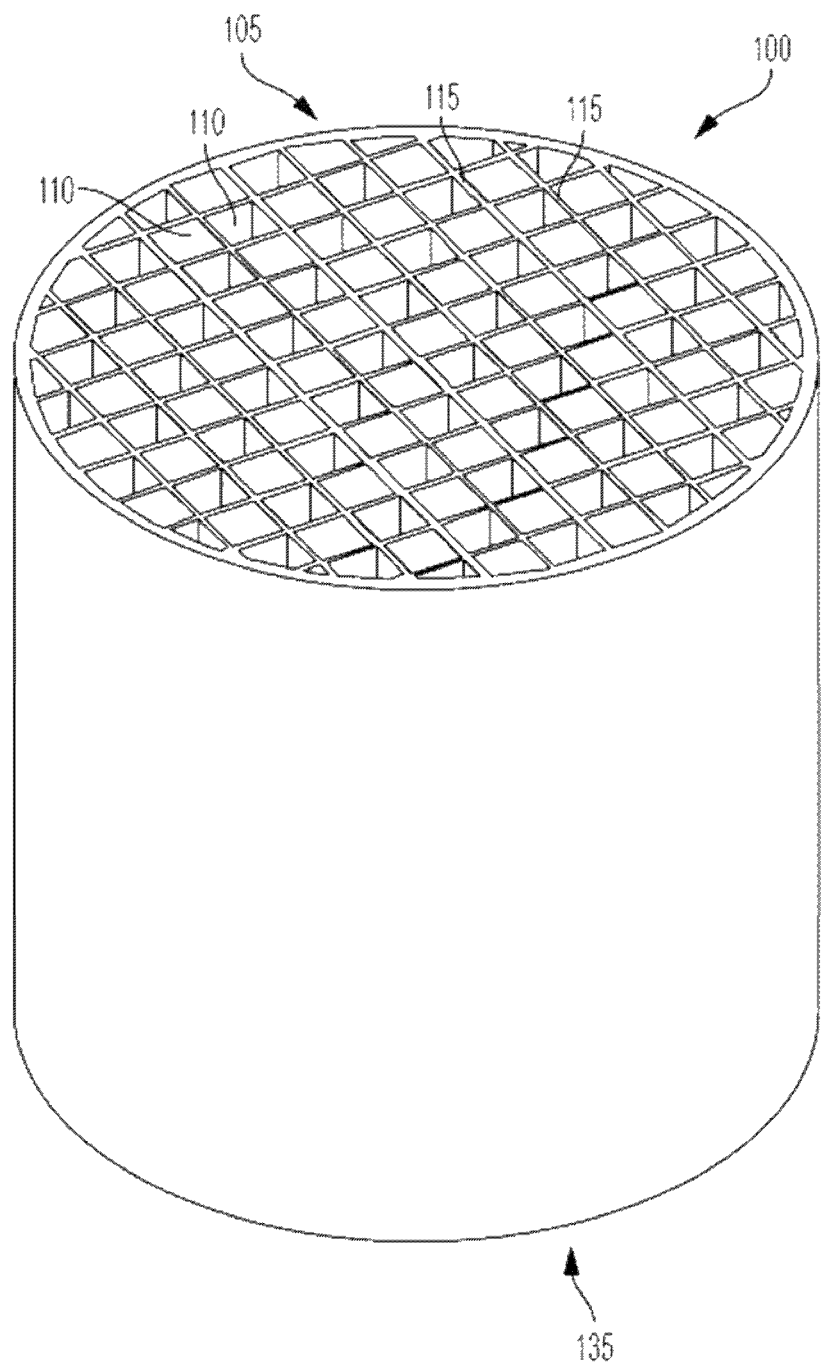
FIG. 1 schematically depicts a honeycomb body according to embodiments disclosed and described herein.

Reference will now be made in detail to embodiments of honeycomb bodies comprising a porous honeycomb body with a porous inorganic layer thereon, embodiments of which are illustrated in the accompanying drawings. Whenever possible, the same reference numerals will be used throughout the drawings to refer to the same or like parts.

Aspects of the disclosure pertain to articles such as ceramic articles and methods for their manufacture and use. In some embodiments, the ceramic articles comprise honeycomb bodies comprised of a porous ceramic honeycomb structure of porous walls having wall surfaces defining a plurality of inner channels.

In some embodiments, the porous ceramic walls comprise a material such as a filtration material which may comprise a porous inorganic layer disposed on one or more surfaces of the walls. In some embodiments, the filtration material comprises one or more inorganic materials, such as one or more ceramic or refractory materials. In some embodiments, the filtration material is disposed on the walls to provide enhanced filtration efficiency, both locally through and at the wall and globally through the honeycomb body, at least in the initial use of the honeycomb body as a filter following a clean state, or regenerated state, of the honeycomb body, for example such as before a substantial accumulation of ash and/or soot occurs inside the honeycomb body after extended use of the honeycomb body as a filter.

In one aspect, the filtration material is present as a layer disposed on the surface of one or more of the walls of the honeycomb structure. The layer in some embodiments is porous to allow the gas flow through the wall. In some embodiments, the layer is present as a continuous coating over at least part of the, or over the entire, surface of the one or more walls. In some embodiments of this aspect, the filtration material is flame-deposited filtration material.

In another aspect, the filtration material is present as a plurality of discrete regions of filtration material disposed on the surface of one or more of the walls of the honeycomb structure. The filtration material may partially block a portion of some of the pores of the porous walls, while still allowing gas flow through the wall. In some embodiments of this aspect, the filtration material is aerosol-deposited filtration material. In some preferred embodiments, the filtration material comprises a plurality of inorganic particle agglomerates, wherein the agglomerates are comprised of inorganic or ceramic or refractory material. In some embodiments, the agglomerates are porous, thereby allowing gas to flow through the agglomerates.

In some embodiments, a honeycomb body comprises a porous ceramic honeycomb body comprising a first end, a second end, and a plurality of walls having wall surfaces defining a plurality of inner channels. A deposited material such as a filtration material, which may be a porous inorganic layer, is disposed on one or more wall surfaces of the honeycomb body. The deposited material such as a filtration material, which may be a porous inorganic layer has a porosity in a range of from about 20% to about 95%, or from about 25% to about 95%, or from about 30% to about 95%, or from about 40% to about 95%, or from about 45% to about 95%, or from about 50% to about 95%, or from about 55% to about 95%, or from about 60% to about 95%, or from about 65% to about 95%, or from about 70% to about 95%, or from about 75% to about 95%, or from about 80% to about 95%, or from about 85% to about 95%, from about 30% to about 95%, or from about 40% to about 95%, or from about 45% to about 95%, or from about 50% to about 95%, or from about 55% to about 95%, or from about 60% to about 95%, or from about 65% to about 95%, or from about 70% to about 95%, or from about 75% to about 95%, or from about 80% to about 95%, or from about 85% to about 95%, or from about 20% to about 90%, or from about 25% to about 90%, or from about 30% to about 90%, or from about 40% to about 90%, or from about 45% to about 90%, or from about 50% to about 90%, or from about 55% to about 90%, or from about 60% to about 90%, or from about 65% to about 90%, or from about 70% to about 90%, or from about 75% to about 90%, or from about 80% to about 90%, or from about 85% to about 90%, or from about 20% to about 85%, or from about 25% to about 85%, or from about 30% to about 85%, or from about 40% to about 85%, or from about 45% to about 85%, or from about 50% to about 85%, or from about 55% to about 85%, or from about 60% to about 85%, or from about 65% to about 85%, or from about 70% to about 85%, or from about 75% to about 85%, or from about 80% to about 85%, or from about 20% to about 80%, or from about 25% to about 80%, or from about 30% to about 80%, or from about 40% to about 80%, or from about 45% to about 80%, or from about 50% to about 80%, or from about 55% to about 80%, or from about 60% to about 80%, or from about 65% to about 80%, or from about 70% to about 80%, or from about 75% to about 80%, and the deposited material such as a filtration material, which may be a porous inorganic layer that has an average thickness of greater than or equal to 0.5 μm and less than or equal to 50 μm, or greater than or equal to 0.5 μm and less than or equal to 45 μm, greater than or equal to 0.5 μm and less than or equal to 40 μm, or greater than or equal to 0.5 μm and less than or equal to 35 μm, or greater than or equal to 0.5 μm and less than or equal to 30 μm, greater than or equal to 0.5 μm and less than or equal to 25 μm, or greater than or equal to 0.5 μm and less than or equal to 20 μm, or greater than or equal to 0.5 μm and less than or equal to 15 μm, greater than or equal to 0.5 μm and less than or equal to 10 μm. Various embodiments of honeycomb bodies and methods for forming such honeycomb bodies will be described herein with specific reference to the appended drawings.

The material in some embodiments comprises a filtration material, and in some embodiments comprises an inorganic layer According to one or more embodiments, the inorganic layer provided herein comprises a discontinuous layer formed from the inlet end to the outlet end comprising discrete and disconnected patches of material or filtration material and binder comprised of primary particles in secondary aggregate particles or agglomerates that are substantially spherical. In one or more embodiments, the primary particles are non-spherical. In one or more embodiments, "substantially spherical" refers to an agglomerate having a circularity in cross section in a range of from about 0.8 to about 1 or from about 0.9 to about 1, with 1 representing a perfect circle. In one or more embodiments, 75% of the primary particles deposited on the honeycomb body have a circularity of less than 0.8. In one or more embodiments, the aggregate particles or agglomerates deposited on the honeycomb body have an average circularity greater than 0.9, greater than 0.95, greater than 0.96, greater than 0.97, greater than 0.98, or greater than 0.99.

Circularity can be measured using a scanning electron microscope (SEM). The term "circularity of the cross-section (or simply circularity)" is a value expressed using the equation shown below. A circle having a circularity of 1 is a perfect circle. Circularity=(4π×cross-sectional area)/(length of circumference of the cross-section)$^2$.

In one or more embodiments, the "filtration material" provides enhanced filtration efficiency to the honeycomb body, both locally through and at the wall and globally through the honeycomb body. In one or more embodiments, "filtration material" is not considered to be catalytically active in that it does not react with components of a gaseous mixture of an exhaust stream.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to".

A honeycomb body, as referred to herein, is a shaped ceramic honeycomb structure of intersecting walls to form cells the define channels. The ceramic honeycomb structure may be formed, extruded, or molded, and may be of any shape or size. For example, a ceramic honeycomb structure may be a filter body formed from cordierite or other suitable ceramic material.

A honeycomb body, as referred to herein, may also be defined as a shaped ceramic honeycomb structure having at least one layer applied to wall surfaces of the honeycomb structure, configured to filter particulate matter from a gas stream. There may be more than one layer applied to the same location of the honeycomb structure. The layer may comprise inorganic material, organic material or both inorganic material and organic material. For example, a honeycomb body may, in one or more embodiments, be formed from cordierite or other ceramic material and have a porous inorganic layer applied to surfaces of the cordierite honeycomb structure.

As used herein, "green" or "green ceramic" are used interchangeably and refer to an unsintered material, unless otherwise specified.

A honeycomb body of one or more embodiments may comprise a honeycomb structure and deposited material such as a filtration material, which may be a porous inorganic layer disposed on one or more walls of the honeycomb structure. In some embodiments, the deposited material such as a filtration material, which may be a porous inorganic layer is applied to surfaces of walls present within honeycomb structure, where the walls have surfaces that define a plurality of inner channels.

The inner channels, when present, may have various cross-sectional shapes, such as circles, ovals, triangles, squares, pentagons, hexagons, or tessellated combinations or any of these, for example, and may be arranged in any suitable geometric configuration. The inner channels, when present, may be discrete or intersecting and may extend through the honeycomb body from a first end thereof to a second end thereof, which is opposite the first end.

With reference now to FIG. 1, a honeycomb body 100 according to one or more embodiments shown and described herein is depicted. The honeycomb body 100 may, in embodiments, comprise a plurality of walls 115 defining a plurality of inner channels 110. The plurality of inner channels 110 and intersecting channel walls 115 extend between first end 105, which may be an inlet end, and second end 135, which may be an outlet end, of the honeycomb body.

In one or more embodiments, the honeycomb body may be formed from cordierite, aluminum titanate, enstatite, mullite, forsterite, corundum (SiC), spinel, sapphirine, and periclase. In general, cordierite is a solid solution having a composition according to the formula $(Mg,Fe)_2Al_3(Si_5AlO_{18})$. In some embodiments, the pore size of the ceramic material may be controlled, the porosity of the ceramic material may be controlled, and the pore size distribution of the ceramic material may be controlled, for example by varying the particle sizes of the ceramic raw materials. In addition, pore formers may be included in ceramic batches used to form the honeycomb body.

In some embodiments, walls of the honeycomb body may have an average thickness from greater than or equal to 25 μm to less than or equal to 250 μm, such as from greater than or equal to 45 μm to less than or equal to 230 μm, greater than or equal to 65 μm to less than or equal to 210 μm, greater than or equal to 65 μm to less than or equal to 190 μm, or greater than or equal to 85 μm to less than or equal to 170 μm. The walls of the honeycomb body can be described to have a base portion comprised of a bulk portion (also referred to herein as the bulk), and surface portions (also referred to herein as the surface). The surface portion of the walls extends from a surface of a wall of the honeycomb body into the wall toward the bulk portion of the honeycomb body. The surface portion may extend from 0 (zero) to a depth of about 10 μm into the base portion of the wall of the honeycomb body. In some embodiments, the surface portion may extend about 5 μm, about 7 μm, or about 9 μm (i.e., a depth of 0 (zero)) into the base portion of the wall. The bulk portion of the honeycomb body constitutes the thickness of wall minus the surface portions. Thus, the bulk portion of the honeycomb body may be determined by the following equation:

$$t_{total}-2t_{surface}$$

where $t_{total}$ is the total thickness of the wall and $t_{surface}$ is the thickness of the wall surface.

In one or more embodiments, the bulk of the honeycomb body (prior to applying any material or filtration material or layer) has a bulk mean pore size from greater than or equal to 7 μm to less than or equal to 25 μm, such as from greater than or equal to 12 μm to less than or equal to 22 μm, or from greater than or equal to 12 μm to less than or equal to 18 μm. For example, in some embodiments, the bulk of the honeycomb body may have bulk mean pore sizes of about 10 μm, about 11 μm, about 12 μm, about 13 μm, about 14 μm, about 15 μm, about 16 μm, about 17 μm, about 18 μm, about 19 μm, or about 20 μm. Generally, pore sizes of any given material exist in a statistical distribution. Thus, the term "mean pore size" or "$d_{50}$" (prior to applying any material or filtration material or layer) refers to a length measurement, above which the pore sizes of 50% of the pores lie and below which the pore sizes of the remaining 50% of the pores lie, based on the statistical distribution of all the pores. Pores in ceramic bodies can be manufactured by at least one of: (1) inorganic batch material particle size and size distributions; (2) furnace/heat treatment firing time and temperature schedules; (3) furnace atmosphere (e.g., low or high oxygen and/or water content), as well as; (4) pore formers, such as, for example, polymers and polymer particles, starches, wood flour, hollow inorganic particles and/or graphite/carbon particles.

In specific embodiments, the mean pore size ($d_{50}$) of the bulk of the honeycomb body (prior to applying any material or filtration material or layer) is in a range of from 10 μm to about 16 μm, for example 13-14 μm, and the $d_{10}$ refers to a length measurement, above which the pore sizes of 90% of the pores lie and below which the pore sizes of the remaining 10% of the pores lie, based on the statistical distribution of all the pores is about 7 μm. In specific embodiments, the doo refers to a length measurement, above which the pore sizes of 10% of the pores of the bulk of the honeycomb body (prior to applying any material or filtration material or layer) lie and below which the pore sizes of the remaining 90% of the pores lie, based on the statistical distribution of all the pores is about 30 μm. In specific embodiments, the mean or average diameter ($D_{50}$) of the secondary aggregate particles or agglomerates is about 2 microns. In specific embodiments, it has been determined that when the agglomerate mean size $D_{50}$ and the mean wall pore size of the bulk honeycomb body $d_{50}$ is such that there is a ratio of agglomerate mean size $D_{50}$ to mean wall pore size of the bulk honeycomb body $d_{50}$ is in a range of from 5:1 to 16:1, excellent filtration efficiency results and low pressure drop results are achieved. In more specific embodiments, a ratio of agglomerate mean size $D_{50}$ to mean wall pore size of the bulk of honeycomb body $d_{50}$ (prior to applying any material or filtration material or layer) is in a range of from 6:1 to 16:1, 7:1 to 16:1, 8:1 to 16:1, 9:1 to 16:1, 10:1 to 16:1, 11:1 to 16:1 or 12:1 to 6:1 provide excellent filtration efficiency results and low pressure drop results.

In some embodiments, the bulk of the honeycomb body may have bulk porosities, not counting a coating, of from greater than or equal to 50% to less than or equal to 75% as measured by mercury intrusion porosimetry. Other methods for measuring porosity include scanning electron microscopy (SEM) and X-ray tomography, these two methods in particular are valuable for measuring surface porosity and bulk porosity independent from one another. In one or more embodiments, the bulk porosity of the honeycomb body may be in a range of from about 50% to about 75%, in a range of from about 50% to about 70%, in a range of from about 50% to about 65%, in a range of from about 50% to about 60%, in a range of from about 50% to about 58%, in a range of from about 50% to about 56%, or in a range of from about 50% to about 54%, for example.

In one or more embodiments, the surface portion of the honeycomb body has a surface mean pore size from greater than or equal to 7 μm to less than or equal to 20 μm, such as from greater than or equal to 8 μm to less than or equal to 15 μm, or from greater than or equal to 10 μm to less than or equal to 14 μm. For example, in some embodiments, the surface of the honeycomb body may have surface mean pore sizes of about 8 μm, about 9 μm, about 10 μm, about 11 μm, about 12 μm, about 13 μm, about 14 μm, or about 15 μm.

In some embodiments, the surface of the honeycomb body may have surface porosities, prior to application of a layer, of from greater than or equal to 35% to less than or equal to 75% as measured by mercury intrusion porosimetry, SEM, or X-ray tomography. In one or more embodiments, the surface porosity of the honeycomb body may be less than 65%, such as less than 60%, less than 55%, less than 50%, less than 48%, less than 46%, less than 44%, less than 42%, less than 40%, less than 48%, or less than 36% for example.

Figure 2:
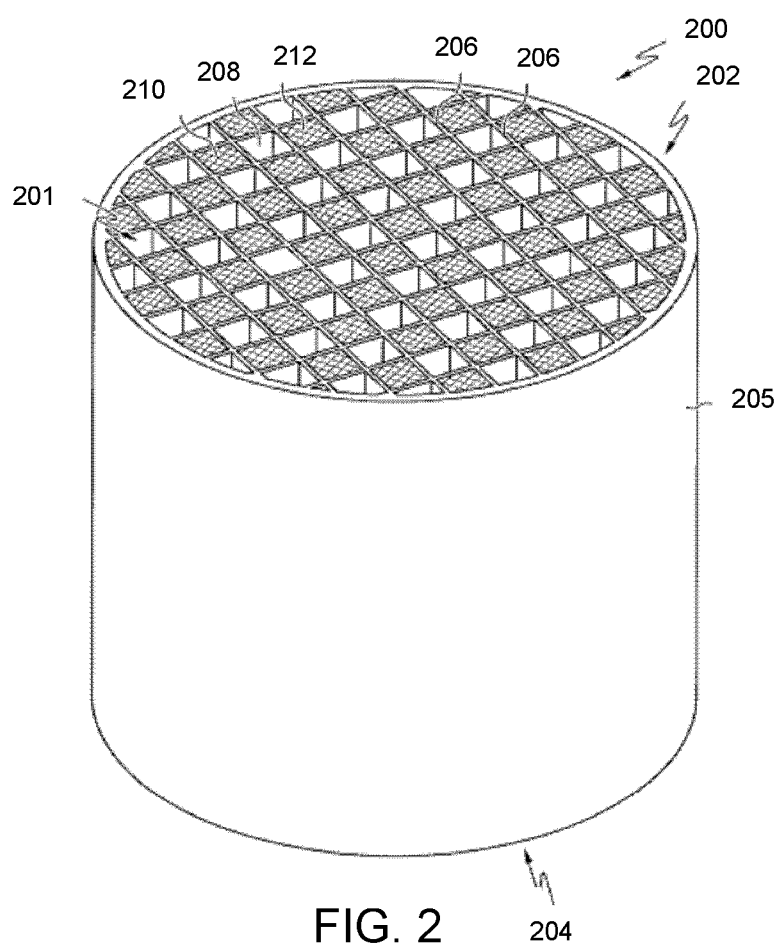
FIG. 2 schematically depicts a particulate filter according to embodiments disclosed and described herein.

Referring now to FIG. 2, a honeycomb body in the form of a particulate filter 200 is schematically depicted. The particulate filter 200 may be used as a wall-flow filter to filter particulate matter from an exhaust gas stream 250, such as an exhaust gas stream emitted from a gasoline engine, in which case the particulate filter 200 is a gasoline particulate filter. The particulate filter 200 generally comprises a honeycomb body having a plurality of channels 201 or cells which extend between an inlet end 202 and an outlet end 204, defining an overall length La (shown in FIG. 3). The channels 201 of the particulate filter 200 are formed by, and at least partially defined by a plurality of intersecting channel walls 206 that extend from the inlet end 202 to the outlet end 204. The particulate filter 200 may also include a skin layer 205 surrounding the plurality of channels 201. This skin layer 205 may be extruded during the formation of the channel walls 206 or formed in later processing as an after-applied skin layer, such as by applying a skinning cement to the outer peripheral portion of the channels.

Figure 3:
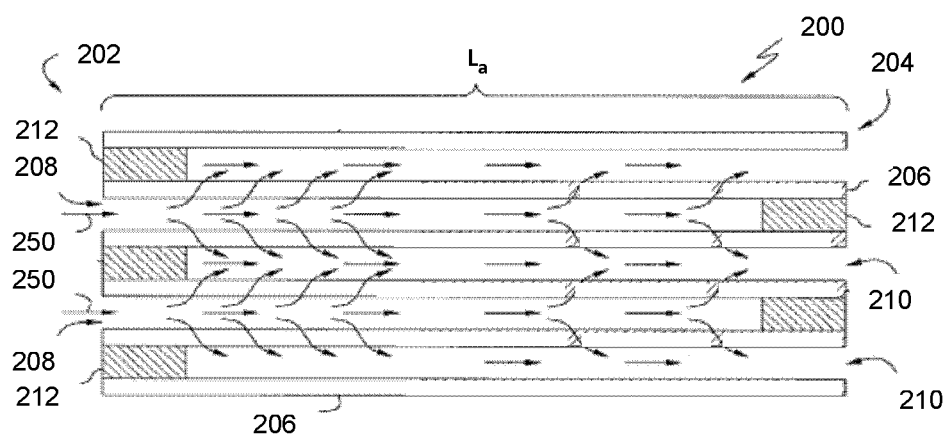
FIG. 3 is a cross-sectional view of the particulate filter shown in FIG. 2.

An axial cross section of the particulate filter 200 of FIG. 2 is shown in FIG. 3. In some embodiments, certain channels are designated as inlet channels 208 and certain other channels are designated as outlet channels 210. In some embodiments of the particulate filter 200, at least a first set of channels may be plugged with plugs 212. Generally, the plugs 212 are arranged proximate the ends (i.e., the inlet end or the outlet end) of the channels 201. The plugs are generally arranged in a pre-defined pattern, such as in the checkerboard pattern shown in FIG. 2, with every other channel being plugged at an end. The inlet channels 208 may be plugged at or near the outlet end 204, and the outlet channels 210 may be plugged at or near the inlet end 202 on channels not corresponding to the inlet channels, as depicted in FIG. 3. Accordingly, each cell may be plugged at or near one end of the particulate filter only.

While FIG. 2 generally depicts a checkerboard plugging pattern, it should be understood that alternative plugging patterns may be used in the porous ceramic honeycomb article. In the embodiments described herein, the particulate filter 200 may be formed with a channel density of up to about 600 channels per square inch (cpsi). For example, in some embodiments, the particulate filter 100 may have a channel density in a range from about 100 cpsi to about 600 cpsi. In some other embodiments, the particulate filter 100 may have a channel density in a range from about 100 cpsi to about 400 cpsi or even from about 200 cpsi to about 300 cpsi.

In the embodiments described herein, the channel walls 206 of the particulate filter 200 may have a thickness of greater than about 4 mils (101.6 microns). For example, in some embodiments, the thickness of the channel walls 206 may be in a range from about 4 mils up to about 30 mils (762 microns). In some other embodiments, the thickness of the channel walls 206 may be in a range from about 7 mils (177.8 microns) to about 20 mils (508 microns).

In some embodiments of the particulate filter 200 described herein the channel walls 206 of the particulate filter 200 may have a bare open porosity (i.e., the porosity before any coating is applied to the honeycomb body) % P≥35% prior to the application of any coating to the particulate filter 200. In some embodiments the bare open porosity of the channel walls 206 may be such that 40%≤% P≤75%. In other embodiments, the bare open porosity of the channel walls 206 may be such that 45%≤% P≤75%, 50%≤% P≤75%, 55%≤% P≤75%, 60%≤% P≤75%, 45%≤% P≤70%, 50%≤% P≤70%, 55%≤% P≤70%, or 60%≤% P≤70%.

Further, in some embodiments, the channel walls 206 of the particulate filter 200 are formed such that the pore distribution in the channel walls 206 has a mean pore size of ≤30 microns prior to the application of any coatings (i.e., bare). For example, in some embodiments, the mean pore size may be 28 microns and less than or ≤30 microns. In other embodiments, the mean pore size may be ≥10 microns and less than or ≤30 microns. In other embodiments, the mean pore size may be ≥10 microns and less than or ≤25 microns. In some embodiments, particulate filters produced with a mean pore size greater than about 30 microns have reduced filtration efficiency while with particulate filters produced with a mean pore size less than about 8 microns may be difficult to infiltrate the pores with a washcoat containing a catalyst. Accordingly, in some embodiments, it is desirable to maintain the mean pore size of the channel wall in a range of from about 8 microns to about 30 microns, for example, in a range of rom 10 microns to about 20 microns.

In one or more embodiments described herein, the honeycomb body of the particulate filter 200 is formed from a metal or ceramic material such as, for example, cordierite, silicon carbide, aluminum oxide, aluminum titanate or any other ceramic material suitable for use in elevated temperature particulate filtration applications. For example, the particulate filter 200 may be formed from cordierite by mixing a batch of ceramic precursor materials which may include constituent materials suitable for producing a ceramic article which predominately comprises a cordierite crystalline phase. In general, the constituent materials suitable for cordierite formation include a combination of inorganic components including talc, a silica-forming source, and an alumina-forming source. The batch composition may additionally comprise clay, such as, for example, kaolin clay. The cordierite precursor batch composition may also contain organic components, such as organic pore formers, which are added to the batch mixture to achieve the desired pore size distribution. For example, the batch composition may comprise a starch which is suitable for use as a pore former and/or other processing aids. Alternatively, the constituent materials may comprise one or more cordierite powders suitable for forming a sintered cordierite honeycomb structure upon firing as well as an organic pore former material.

The batch composition may additionally comprise one or more processing aids such as, for example, a binder and a liquid vehicle, such as water or a suitable solvent. The processing aids are added to the batch mixture to plasticize the batch mixture and to generally improve processing, reduce the drying time, reduce cracking upon firing, and/or aid in producing the desired properties in the honeycomb body. For example, the binder can include an organic binder. Suitable organic binders include water soluble cellulose ether binders such as methylcellulose, hydroxypropyl methylcellulose, methylcellulose derivatives, hydroxyethyl acrylate, polyvinylalcohol, and/or any combinations thereof. Incorporation of the organic binder into the plasticized batch composition allows the plasticized batch composition to be readily extruded. In some embodiments, the batch composition may include one or more optional forming or processing aids such as, for example, a lubricant which assists in the extrusion of the plasticized batch mixture. Exemplary lubricants can include tall oil, sodium stearate or other suitable lubricants.

After the batch of ceramic precursor materials is mixed with the appropriate processing aids, the batch of ceramic precursor materials is extruded and dried to form a green honeycomb body comprising an inlet end and an outlet end with a plurality of channel walls extending between the inlet end and the outlet end. Thereafter, the green honeycomb body is fired according to a firing schedule suitable for producing a fired honeycomb body. At least a first set of the channels of the fired honeycomb body are then plugged in a predefined plugging pattern with a ceramic plugging composition and the fired honeycomb body is again fired to ceram the plugs and secure the plugs in the channels.

Figure 4:
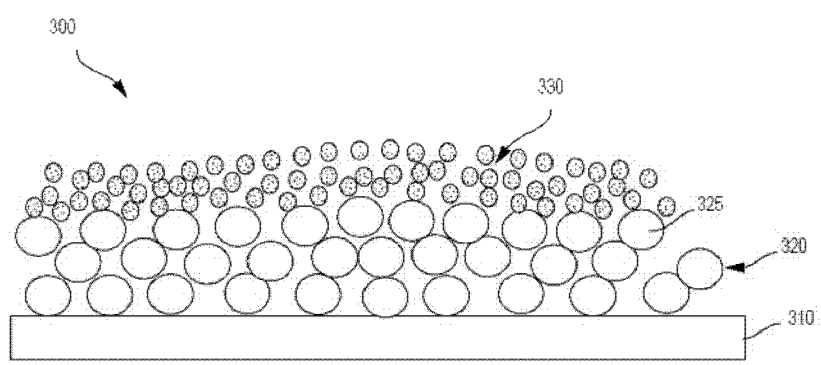
FIG. 4 schematically depicts a wall of a honeycomb body with soot loading according to embodiments disclosed and described herein.

In various embodiments the honeycomb body is configured to filter particulate matter from a gas stream, for example, an exhaust gas stream from a gasoline engine. Accordingly, the mean pore size, porosity, geometry and other design aspects of both the bulk and the surface of the honeycomb body are selected taking into account these filtration requirements of the honeycomb body. As an example, and as shown in the embodiment of FIG. 4, a wall 310 of the honeycomb body 300, which can be in the form of the particulate filter as shown in FIGS. 2 and 3, has layer 320 disposed thereon, which in some embodiments is sintered or otherwise bonded by heat treatment. The layer 320 may comprise particles 325 that are deposited on the wall 310 of the honeycomb body 300 and help prevent particulate matter from exiting the honeycomb body along with the gas stream 330, such as, for example, soot and ash, and to help prevent the particulate matter from clogging the base portion of the walls 310 of the honeycomb body 300. In this way, and according to embodiments, the layer 320 can serve as the primary filtration component while the base portion of the honeycomb body can be configured to otherwise minimize pressure drop for example as compared to conventional honeycomb bodies without such layer. As will be described in further detail herein, the layer may be formed by a suitable method, such as, for example, an aerosol deposition method. Aerosol deposition enables the formation of a thin, porous layer at least some surfaces of the walls of the honeycomb body. An advantage of the aerosol deposition method according to one or more embodiments is that honeycomb bodies can be produced more economically than in other techniques such as flame deposition processes. However, several difficulties were encountered using an aerosol deposition method. The present specification provides a manufacturing method that avoided difficulties associated with aerosol deposition processes. According to one or more embodiments, the aerosol deposition processes produce a unique primary particle morphology, described further below.

According to one or more embodiments, a process is provided which includes forming an aerosol with a binder process, which is deposited on a honeycomb body to provide a high filtration efficiency material, which may be an inorganic layer, on the honeycomb body to provide a gasoline particulate filter. According to one or more embodiments, the performance is >90% filtration efficiency with a<10% pressure drop penalty compared to the bare filter. According to one or more embodiments, the process can include the steps of solution preparation, atomization, drying, and deposition of material on the walls of a wall flow filter and curing. It has been discovered that a material such as a porous inorganic layer having a high mechanical integrity can be formed without any sintering steps (e.g., heating to temperatures in excess of 1000° C.) by aerosol deposition with binder. In a particular embodiment, filtration efficiency of the material, which may be an inorganic layer, at 0.01 g/L soot loading was increased from 78.4% to 97.6%, with less than 10% pressure drop penalty.

According to one or more embodiments, an exemplary process flow includes solution preparation, atomizing, drying, deposition on a honeycomb body and curing. Each of these steps will be now be discussed in more detail in accordance with an exemplary embodiment.

Solution Preparation

Commercially available inorganic particles were used as a raw material to produce suspensions in the formation of an inorganic material, which may be an inorganic layer. According to one or more embodiments, the particles are selected from $Al_2O_3$, $SiO_2$, $TiO_2$, $CeO_2$, $ZrO_2$, SiC, MgO and combinations thereof. In some embodiments, the suspension is aqueous-based, and in other embodiments, the suspension is organic-based, for example, an alcohol such as ethanol or methanol.

In one or more embodiments, the particles have an average primary particle size in a range of from about 10 nm to 4 about microns, about 20 nm to about 3 microns or from about 50 nm to about 2 microns, or from about 50 nm to about 900 nm or from about 50 nm to about 600 nm. In specific embodiments, the average primary particle size is in a range of from about 100 nm to about 200 nm, for example, 150 nm. The average primary particle size can be determined as a calculated value from the BET surface are of the aerosol particles, which in some embodiments is 10 $m^2/g$ currently.

In one or more embodiments, the primary particles comprise a ceramic particle, such as an oxide particle, for example $Al_2O_3$, $SiO_2$, MgO, $CeO_2$, $ZrO_2$, CaO, $TiO_2$, cordierite, mullite, SiC, aluminum titanate, and mixture thereof.

The solution is formed using a solvent which is added to dilute the suspension if needed. Decreasing the solids content in the solution could reduce the aggregate size proportionally if the droplet generated by atomizing has similar size. The solvent should be miscible with suspension mentioned above, and be a solvent for binder and other ingredients.

Binder is added to reinforce the material, which comprise inorganic binder, to provide mechanical integrity to deposited material. The binder provides binding strength between particles at elevated temperature (>500° C.). The starting material can be organic. After exposure to high temperature in excess of about 150° C., the organic will decompose or react with moisture and oxygen in the air, and the final deposited material composition could comprise $Al_2O_3$, $SiO_2$, MgO, $CeO_2$, $ZrO_2$, CaO, $TiO_2$, cordierite, mullite, SiC, aluminum titanate, and mixture thereof. One example of a suitable binder is Dowsil™ US-CF-2405 and Dowsil™ US-CF-2403, both available from The Dow Chemical Company.

Catalyst can be added to accelerate the cure reaction of binder. The catalyst used to accelerate the cure reaction of Dowsil™ US-CF-2405 is titanium butoxide.

Atomizing

The mixture prepared is atomized into fine droplets by high pressure gas through a nozzle. One example of the nozzle is 1/4 J-SS+SU11-SS from Spraying Systems Co., with fluid cap 2050 and air cap 67147. The pressure of the atomizing gas is in the rage of 20 psi to 150 psi. The pressure of the liquid is in the range of 1 to 100 psi. The average droplet size according to one or more embodiments is in the range of from 1 micron to 40 microns, for example, in a range of 5 microns to 10 microns. The droplet size can be adjusted by adjusting the surface tension of the solution, viscosity of the solution, density of the solution, gas flow rate, gas pressure, liquid flow rate, liquid pressure, and nozzle design. In one or more embodiments, the atomizing gas comprises air, nitrogen or mixture thereof. In specific embodiments, the atomizing gas and the apparatus does not comprise air.

Drying

To avoid liquid capillary force impact which forms non-uniform material, which may be an inorganic layer, resulting high pressure drop penalty, the droplets are dried in a deposition chamber, forming dry solid secondary aggregate particles. The solvent is evaporated and passes through the honeycomb body in the gas phase so that liquid solvent residual or condensation is minimized during material deposition. When the inorganic material is carried into the honeycomb body by gas flow, the residual in the inorganic material should be less than 10 wt %. All others should be evaporated in the drying steps and form gas phase. The liquid residual includes solvent in the solution (such as ethanol in the examples), water condensed from the gas phase. Binder is not considered as liquid residual, even if it may be in liquid state before cure.

Deposition in Honeycomb Body

The secondary aggregate particles or agglomerates of the primary particles are carried in gas flow, and the secondary aggregate particles or agglomerates are deposited on inlet wall surfaces of the honeycomb body when the air pass through the honeycomb body. The flow can be driven by a fan, a blower or a vacuum pump.

In one or more embodiments, the average diameter of the secondary aggregate particles or agglomerates is in a range of from 300 nm micron to 10 microns, 300 nm to 8 microns, 300 nm micron to 7 microns, 300 nm micron to 6 microns, 300 nm micron to 5 microns, 300 nm micron to 4 microns, or 300 nm micron to 3 microns. In specific embodiments, the average diameter of the secondary aggregate particles or agglomerates is about 2 microns. The average diameter of the secondary aggregate particles or agglomerates can be measured by a scanning electron microscope.

In one or more embodiments, the average diameter of the secondary aggregate particles or agglomerates is in a range of from 300 nm to 10 microns, 300 nm to 8 microns, 300 nm to 7 microns, 300 nm to 6 microns, 300 nm to 5 microns, 300 nm to 4 microns, or 300 nm to 3 microns, and there is a ratio in the average diameter of the secondary aggregate particles or agglomerates to the average diameter of the primary particles of in range of from about 2:1 to about 10:1; about 2:1 to about 9:1; about 2:1 to about 8:1; about 2:1 to about 7:1; about 2:1 to about 6:1; about 2:1 to about 5:1; about 3:1 to about 10:1; about 3:1 to about 9:1; about 3:1 to about 8:1; about 3:1 to about 7:1; about 3:1 to about 6:1; about 3:1 to about 5:1; about 4:1 to about 10:1; about 4:1 to about 9:1; about 4:1 to about 8:1; about 4:1 to about 7:1; about 4:1 to about 6:1; about 4:1 to about 5:1; about 5:1 to about 10:1; about 5:1 to about 9:1; about 5:1 to about 8:1; about 5:1 to about 7:1; or about 5:1 to about 6:1.

Curing

A post treatment is used to cure the binder according to one or more embodiments. Depending on the binder composition, the curing conditions are varied. According to some embodiments, a low temperature cure reaction is utilized, for example, at a temperature≤100° C. In some embodiments, the curing can be completed in the vehicle exhaust gas with a temperature ≤950° C. A calcination treatment is optional, which can be performed at a temperature≤650° C.

FIG. 5 is a flowchart showing an exemplary process flow according to a specific embodiment.

An example of an apparatus used for deposition of an aerosol with binder process is shown in FIGS. 6A-D.

Figure 6A:
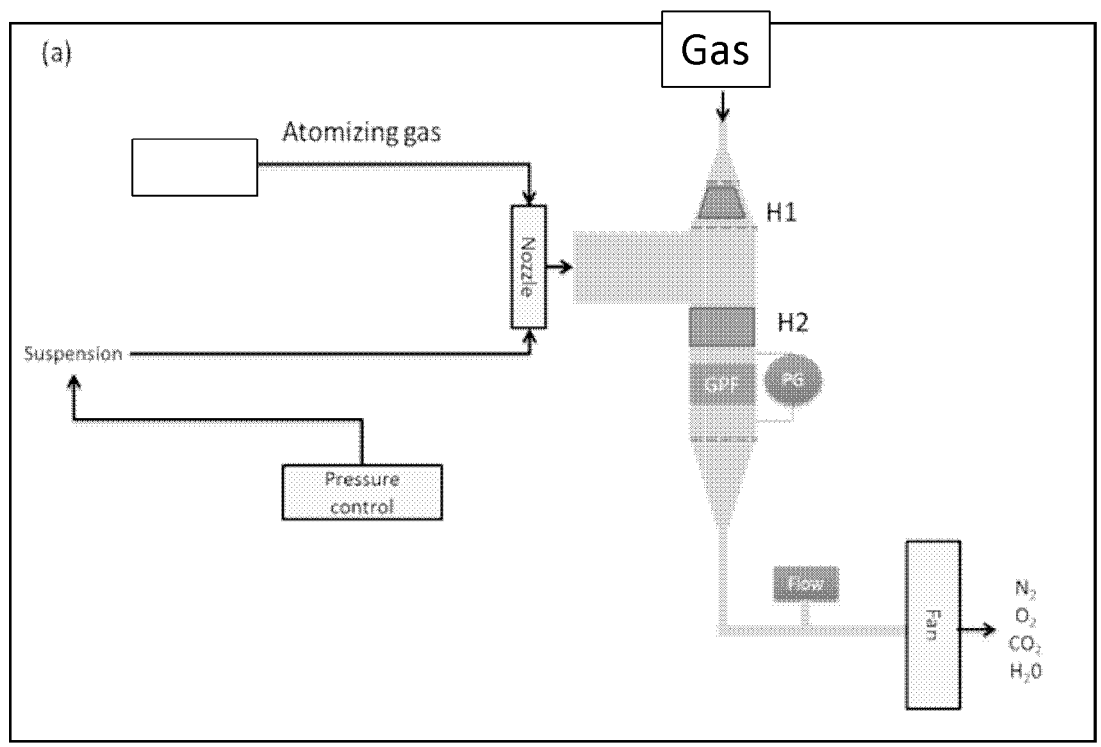
FIG. 6A schematically depicts an apparatus for depositing a material which may be a porous inorganic layer according to embodiments disclosed herein.
Figure 6B:
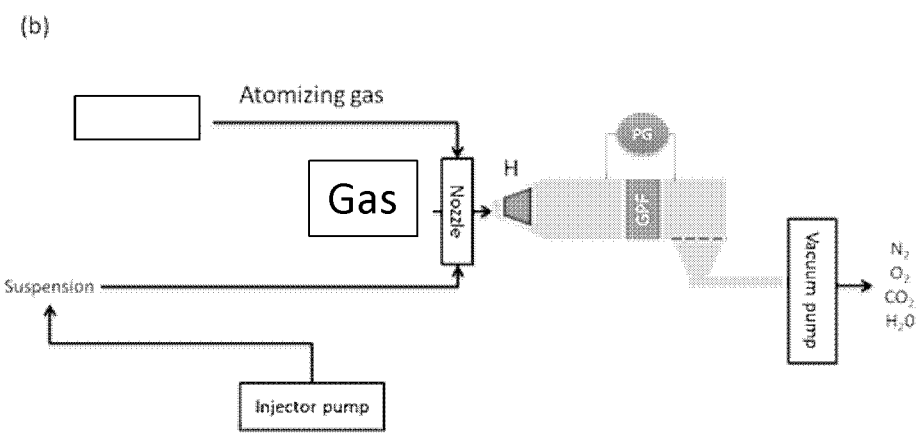
FIG. 6B schematically depicts an apparatus for depositing a material which may be a porous inorganic layer according to embodiments disclosed herein.
Figure 6C:
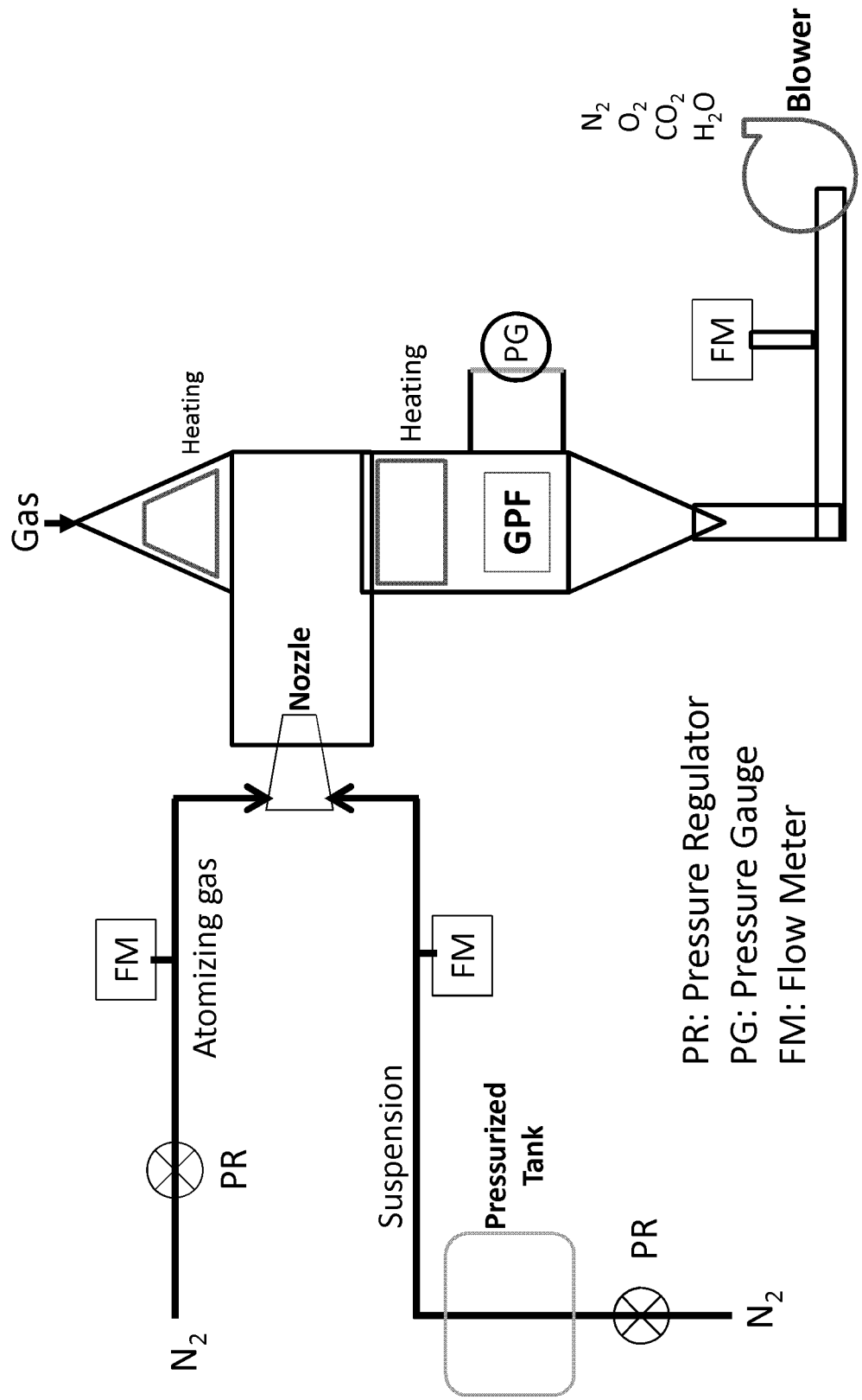
FIG. 6C schematically depicts an apparatus for depositing a material which may be a porous inorganic layer according to embodiments disclosed herein.
Figure 6D:
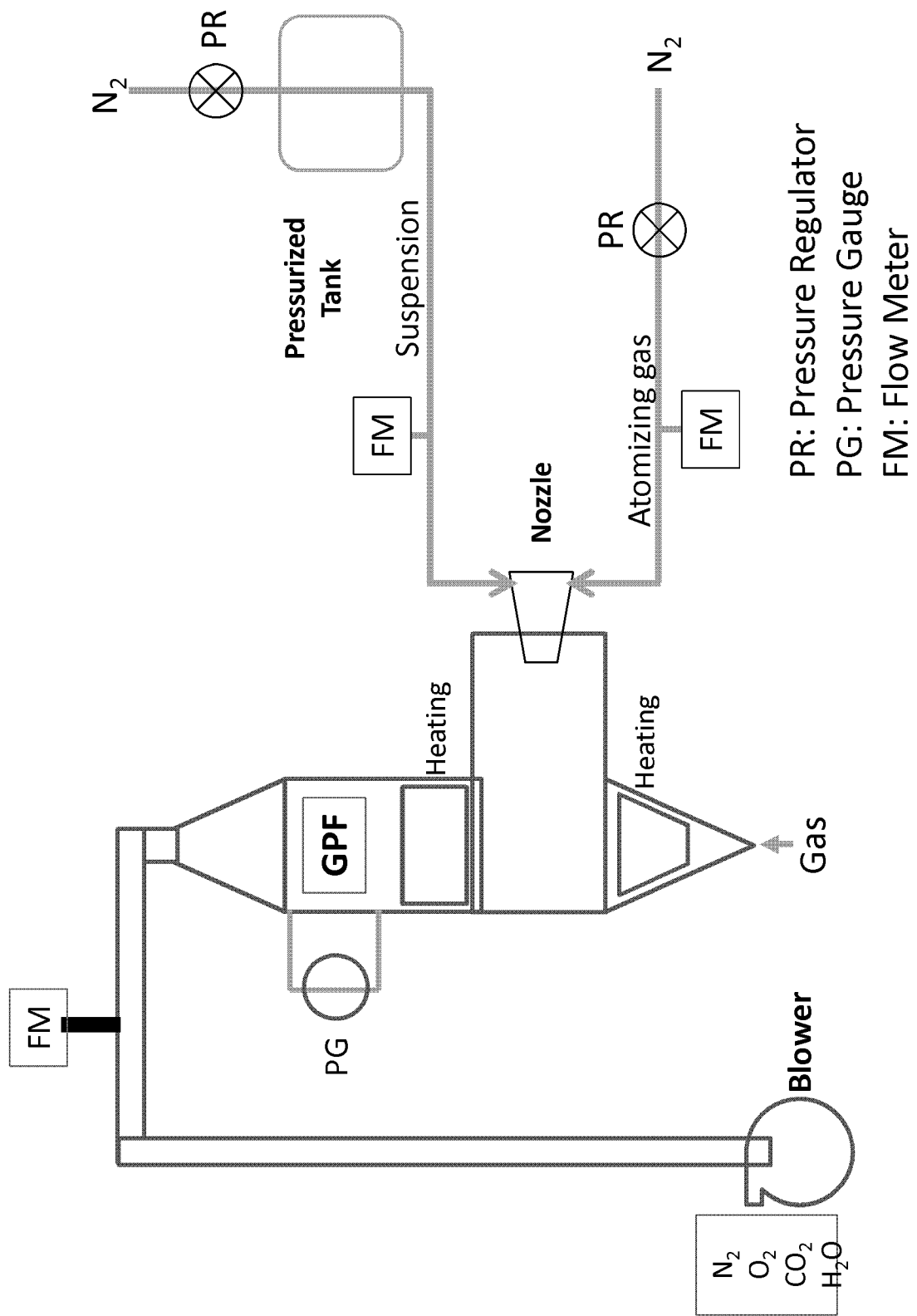
FIG. 6D schematically depicts an apparatus for depositing a material which may be a porous inorganic layer according to embodiments disclosed herein.
Figure 7:
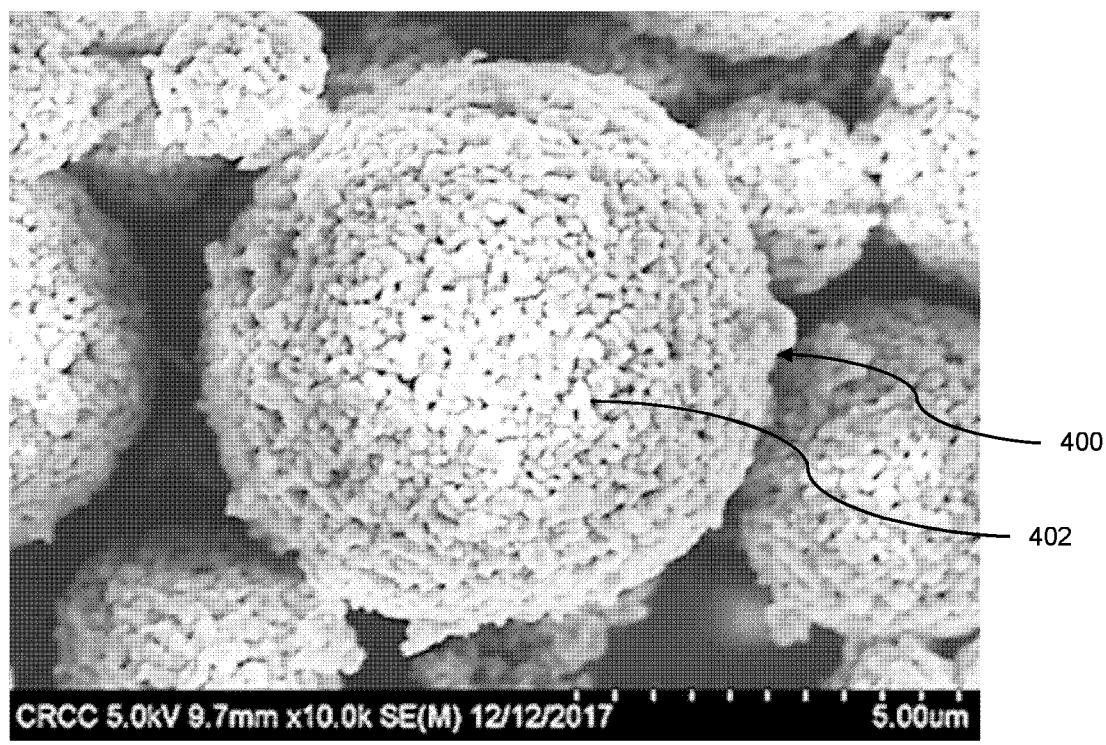
FIG. 7 is an SEM photograph of $Al_2O_3$ aggregates or agglomerates according to embodiments disclosed and describe herein.

FIG. 6A shows a pressure control system which can be used to control agglomerate size when forming agglomerates to be deposited on a gasoline particulate filter, labeled as GPF in FIGS. 6A-D. In FIG. 6A, a pressure controller is in communication with a delivery conduit such as tubing or piping and a suspension of primary particles in a liquid is introduced into the delivery conduit, which is then flowed to the nozzle. In a separate line atomizing gas, which can be any suitable gas such as nitrogen, air, etc., is flowed to the nozzle to atomize the suspension in an appropriate nozzle as described further blow. The GPF is placed in an enclosure as shown in FIG. 6A, and the atomized suspension is directed through the GPF while a gas is flowed through the enclosure from one end. Heaters H1 and H2 heat the gas flowed from the one end of the enclosure and a pressure gauge, labelled as PG in FIGS. 6A-B measures pressure upstream and downstream from the GPF. A fan is placed downstream from the GPF in the enclosure and connected by conduit, and flow is monitored with a flow measurement device as shown in FIG. 6A. According to one or more embodiments, control of the pressure of the suspension delivered to the nozzle can control the agglomerate size formed during the process. The atomized suspension is deposited on one or more walls of the GPF as material, such as filtration material, which may be an inorganic layer comprised of primary particles and formed into agglomerates.

FIG. 6B shows an alternative system which uses flow control to control the agglomerate size. Flow control is provided with an injector pump, which delivers the suspension of primary particles in a liquid as shown through conduit to the nozzle as shown in FIG. 6B. Atomizing gas is flowed through a separate conduit as shown in FIG. 6B and the nozzle atomizes the suspension, which is delivered to the GPF as shown. A pressure gauge, labelled as PG in FIGS. 6A-B measures pressure upstream and downstream from the GPF. Heaters H1 and H2, which may be resistance heaters or other suitable heaters heat the gas delivered from a first end of the enclosure containing the GPF. A fan shown in FIG. 6B is connected to conduit in fluid communication with the enclosure containing the GPF and a flow monitor labelled as FLOW monitors flow rate provided by the fan. The atomized suspension is deposited on one or more walls of the GPF as material, such as filtration material, which may be an inorganic layer comprised of primary particles and formed into agglomerates.

FIG. 6C shows another embodiment of a system for atomizing a suspension to deposit material on a GPF. Nitrogen gas or other suitable process delivers the gas through a conduit which is monitored by a pressure regulator and a flow meter monitors flow rate to the nozzle. In a separate conduit, nitrogen gas or any other suitable process gas is flowed, and a pressure regulator PR monitors pressure. A suspension of primary particles in a liquid is delivered to a nozzle, and flow is measured by a flow meter FM. Gas is delivered to an enclosure having heaters as shown upstream from the GPF in the enclosure. A pressure gauge measures pressure upstream and downstream from the GPF. A blower or fan is in fluid communication with the enclosure containing the GPF via conduit and a flow meter measures the flow in this conduit. The atomized suspension is deposited on one or more walls of the GPF as material, such as filtration material, which may be an inorganic layer comprised of primary particles and formed into agglomerates. It will be appreciated in FIG. 6C, the suspension is delivered in a downward direction. The atomized suspension is deposited on one or more walls of the GPF as material, such as filtration material, which may be an inorganic layer comprised of primary particles and formed into agglomerates.

In FIG. 6D, the system is configured similarly to the system shown in FIG. 6C, except the flow of the suspension is delivered in an upward manner through the GPF as shown, and the blower connected to the enclosure containing the GPF flows gas downstream from the GPF.

In the flowchart of FIG. 5 and the apparatus shown in FIGS. 6A-D, the diameter and length of cordierite honeycomb filters used were 4.055 inches (10.3 cm) and 5.47 inches (13.9 cm). The cells per square inch (CPSI) and wall thickness were 200 and 8 mils. The average pore size was 14 μm.

Particles made from $Al_2O_3$ and having 150 nm average primary particle size were used and a suspension was formed with ethanol (30 wt. % solids, Beijing Dk Nano technology Co. Ltd. The suspension was diluted to 11 wt. % by ethanol (AR, Sinopharm Group Co. LTD). Dowsil™ US-CF-2405 and TnBT were added as binder and cure reaction catalyst. The binder to $Al_2O_3$ ratio was 5 wt %. The catalyst to binder ratio was 1 wt %.

A two-phase fluid nozzle (1/4 J-SS+SU11-SS, Spraying systems Co.) was used to atomize the solution. The atomizing gas was nitrogen at 116 psi, and the liquid pressure was 78 psi. The liquid atomizing speed is about 32 ml/min.

The droplet was dry in a deposition chamber as shown in FIGS. 6A and 6B. FIG. 6A illustrates a pressure control system that was utilized in the examples. FIG. 6B illustrates a flow control system which was not used in the Examples. The gas flow and the droplets were heated up by the heaters placed around the setting temperatures of zone T1-2 and T1-1were 350° C. and 200° C.

The flow was driven by a (TBR R11Q CL.HP from Twin city fan (Shanghai) Co. Ltd.) at 2518 RPM. The total flow rate was 20 $Nm^3/h$ (Normal cubic meter per Hour). Additional air was sucked in the system to make up the total flow required. The deposition onto the honeycomb filter was performed for 173 seconds, and the final $Al_2O_3$ loading was 5.6 g/L.

After deposition, the parts were cured at in a temperature range of rom 40° C. to 200° C. for 10 minutes to 48 hours.

FIG. 6A illustrates the schematic of deposition system. The components include a solution container, and liquid pressure was applied and controlled by nitrogen gas cylinder. Atomization gas was supplied by a nitrogen gas cylinder. Further components in FIG. 6A include Atomization nozzle; Deposition chamber; Heater 1 and heater 2 and a honeycomb body sample holder. The apparatus further comprises a fan, and sensors and control components, including pressure gage for atomizing gas and liquid pressure, differential pressure gage for cross GPF pressure drop monitor, flow meter for overall flow monitor and control, valves.

FIG. 7 illustrates typical aggregates or agglomerates 400 morphology according to one or more embodiments. The primary particles 402 were bonded together to form spherical aggregates or agglomerates 400. In one or more embodiments, the primary particles 402 are non-spherical. In some embodiments, the primary particles 402 are oblong and non-spherical. In some embodiments, the primary particles 402 comprise a closed curve that is non-spherical. In some embodiments, the primary particles 402 comprise multiple lobes. The surface of each aggregate or agglomerate 400 is rough, providing friction between aggregates and aggregate to the honeycomb pores. FIGS. 8A-F show the material, which may be an inorganic layer, morphology and distribution at different depths. The ratio is the distance to inlet face over the total honeycomb body length. The honeycomb body can have a first end and second end. The first end and the second end are separated by an axial length. The aggregates are deposited from the first end and form material, which may be an inorganic layer on the inlet channel walls of the honeycomb body. In some embodiments, the material, which may be an inorganic layer extends the entire axial length of the honeycomb body (i.e., extends along 100% of the axial length). In some embodiments, the layer on the walls of the honeycomb body is not uniform, the thickness is different from 10% of the axial length, 50% of the axial length and 90% of the axial length. The material, which may be an inorganic layer, is thinner at the inlet end (10% axial length from inlet end) and thicker at the outlet end (90% axial length from inlet end). The aggregates or agglomerates 400 block the surface pore and effectively decrease the pore size.

The aggregate 400 size distribution and the relative pore size distribution from SEM image analysis are listed in Table 1. The average diameter, Q1, Q3 and sample numbers are listed. The average aggregate size is in the range of from about 1 micron to about 3 microns. The average pore size at end of channels (90% axial length from inlet end) was smaller than that at inlet (10% axial length from inlet end), because the material was thicker, and the pores were formed by more layer of aggregates. The average pore size was less than 2.5 microns, and significantly smaller than the average pore size of the honeycomb body, which was 14 microns. The pore size was measured from SEM images, as the distance between two adjacent aggregates on the surface. Because the porous inorganic layer is built by multi layers of aggregates, the average pore size in the three dimensional should be less than what measured from a two dimensional measurement.

using the protocol outlined in Tandon et al., 65 CHEMICAL ENGINEERING SCIENCE 4751-60 (2010).

Figure 10:
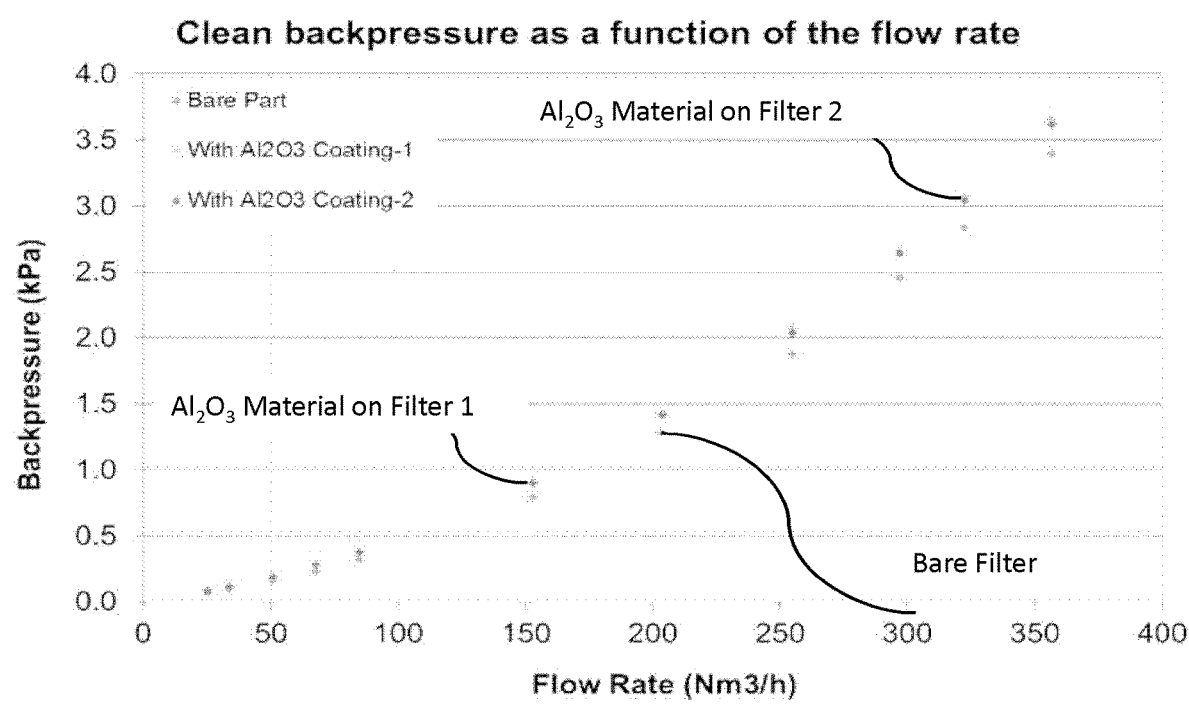
FIG. 10 is a graphical depiction of backpressure versus flow rate of a bare honeycomb body compared with two different honeycomb bodies comprising a material formed on a wall according to embodiments disclosed and described herein.
Figure 11:
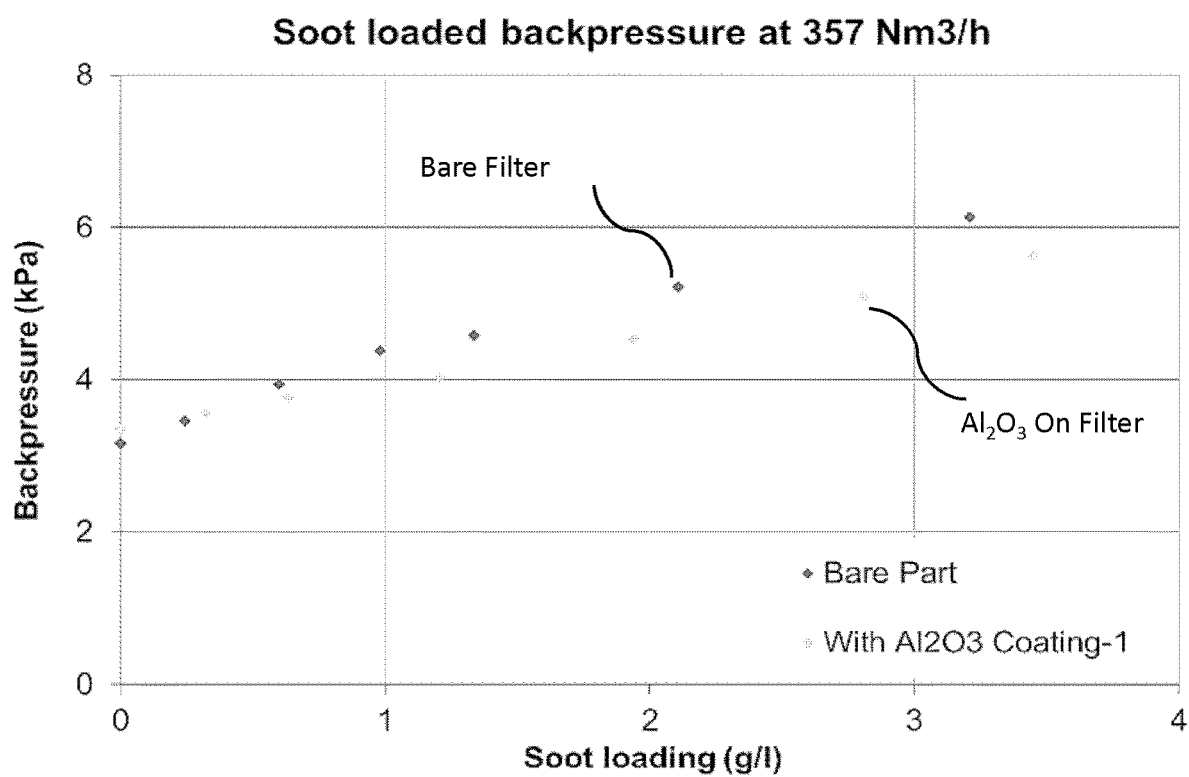
FIG. 11 is a graphical depiction of backpressure versus soot load of a bare honeycomb body compared with a honeycomb body comprising a material formed on a wall according to embodiments disclosed and described herein.
Figure 12A:
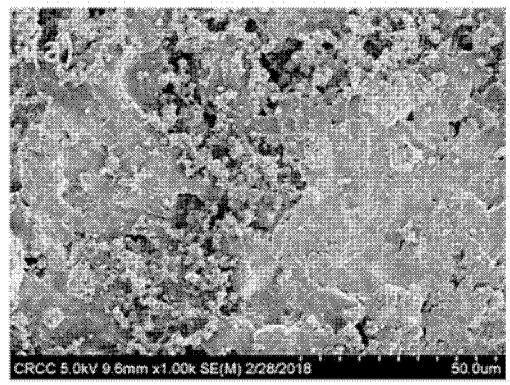
FIG. 12A is an SEM photograph of a honeycomb body comprising a material formed on a wall at 10% depth from the inlet wall surface.
Figure 12B:
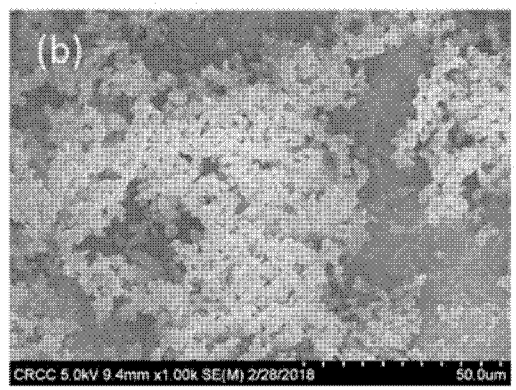
FIG. 12B is an SEM photograph of a honeycomb body comprising aa material formed on a wall at 50% depth from the inlet wall surface.
Figure 12C:
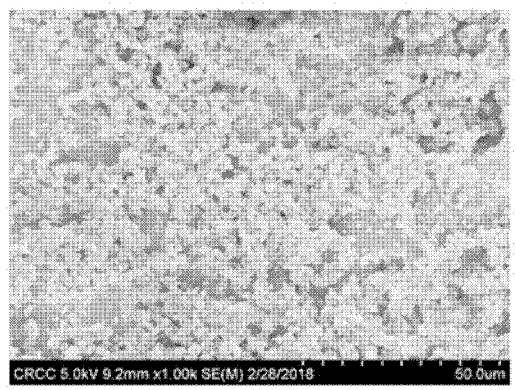
FIG. 12C is an SEM photograph of a honeycomb body comprising a material formed on a wall at 90% depth from the inlet wall surface.
Figure 12D:
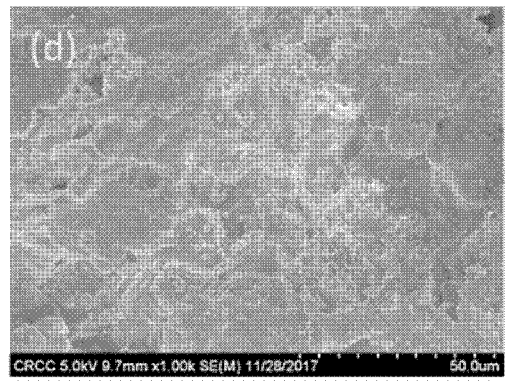
FIG. 12D is an SEM photograph of a cross-section of a honeycomb body comprising a material formed on a wall at 10% depth from the inlet wall surface.
Figure 12E:
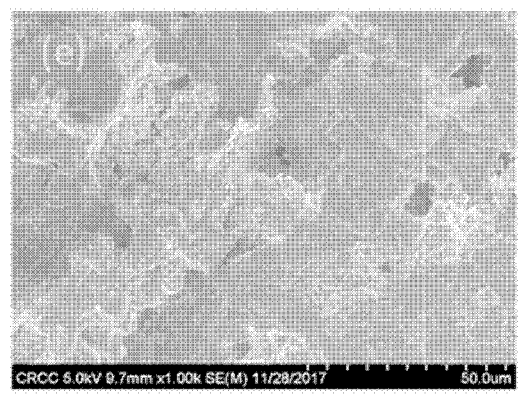
FIG. 12E is SEM photograph of a cross-section of a honeycomb body comprising a material formed on a wall at 50% depth from the inlet wall surface.
Figure 12F:
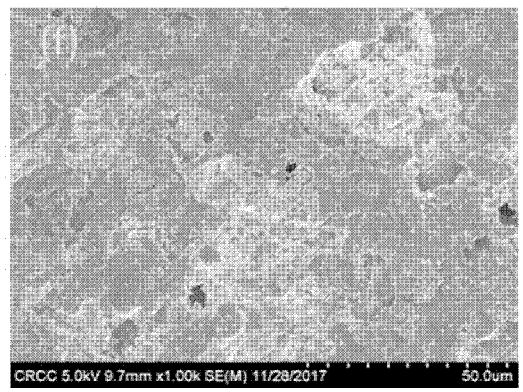
FIG. 12F is SEM photograph of a cross-section of a honeycomb body comprising a material formed on a wall at 90% depth from the inlet wall surface.

FIG. 10 plots the clean pressure drop versus flow rate. The pressure drop penalty at 357 Nm$^3$/h from the $Al_2O_3$ coating is only 7%. The soot loaded pressure drop in FIG. 11 illustrates the improvement from the $Al_2O_3$ coating, which reduces the pressure drop at 3 g/L by 9%.

In one or more embodiments, the porosity of the material, which may be an inorganic layer, disposed on the walls of the honeycomb body, as measured by mercury intrusion porosimetry, SEM, or X-ray tomography is in a range of from about 20% to about 95%, or from about 25% to about 95%, or from about 30% to about 95%, or from about 40% to about 95%, or from about 45% to about 95%, or from about 50% to about 95%, or from about 55% to about 95%, or from about 60% to about 95%, or from about 65% to about 95%, or from about 70% to about 95%, or from about 75% to about 95%, or from about 80% to about 95%, or from about 85% to about 95%, from about 30% to about 95%, or from about 40% to about 95%, or from about 45% to about 95%, or from about 50% to about 95%, or from about 55% to about 95%, or from about 60% to about 95%, or from about 65% to about 95%, or from about 70% to about 95%, or from about 75% to about 95%, or from about 80% to about 95%, or from about 85% to about 95%, or from about 20% to about 90%, or from about 25% to about 90%, or from about 30% to about 90%, or from about 40% to about 90%, or from about 45% to about 90%, or from about 50% to about 90%, or from about 55% to about 90%, or from about 60% to about 90%, or from about 65% to about 90%, or from about 70% to about 90%, or from about 75% to about 90%, or from about 80% to about 90%, or from about 85% to about 90%, or from about 20% to about 85%, or from about 25% to about 85%, or from about 30% to about 85%, or from

TABLE 1

Aggregate size and relative pore size distribution

| | Aggregate Size (micron) | | | Surface Pore Size (micron) | | |
|---|---|---|---|---|---|---|
| | 10% depth | 50% depth | 90% depth | 10% depth | 50% depth | 90% depth |
| Q1 | 1.24 | 1.3375 | 1.51 | 0.99925 | 0.92975 | 0.896 |
| Median | 1.6 | 1.76 | 1.93 | 1.46 | 1.31 | 1.19 |
| Q3 | 2.12 | 2.4425 | 2.47 | 2.3725 | 1.8175 | 1.69 |
| Sample Number | 215 | 202 | 218 | 210 | 216 | 206 |

Q1 = first quartile; Q3 = third quartile.

Due the smaller pore size and small thickness, the $Al_2O_3$ provided high filtration efficiency without a large clean pressure drop penalty. The clean pressure drop is the part pressure drop without soot loading. The soot loaded pressure drop can be even improved by mitigate soot deep bed penetration.

Figure 9:
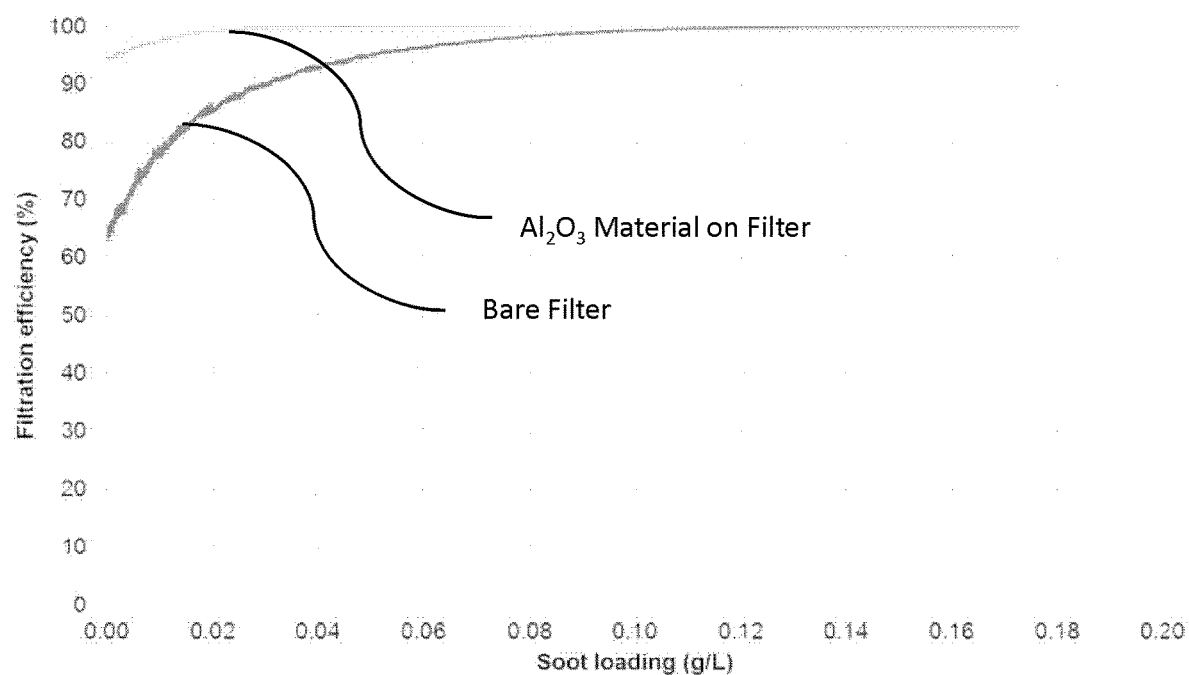
FIG. 9 is a graphical depiction of filtration efficiency comparing a bare honeycomb body with a honeycomb body comprising a material formed on a wall according to embodiments disclosed and described herein.

FIG. 9 compares the filtration efficiency evolving with soot loading between a bare honeycomb body and a honeycomb body with $Al_2O_3$ material, which may be an inorganic layer, coating. The filtration efficiency at 0.01 g/L soot loading was increased from 78.4% to 97.6%. The simulated lab particle number emission was decreased by about one magnitude. It was also one magnitude lower than the Euro6 regulation on GDI vehicle emission. The coating could effectively accelerate the filtration efficiency evolving to 100%, and reduce particle emission significantly. The filtration efficiency of honeycomb bodies is measured herein about 40% to about 85%, or from about 45% to about 85%, or from about 50% to about 85%, or from about 55% to about 85%, or from about 60% to about 85%, or from about 65% to about 85%, or from about 70% to about 85%, or from about 75% to about 85%, or from about 80% to about 85%, or from about 20% to about 80%, or from about 25% to about 80%, or from about 30% to about 80%, or from about 40% to about 80%, or from about 45% to about 80%, or from about 50% to about 80%, or from about 55% to about 80%, or from about 60% to about 80%, or from about 65% to about 80%, or from about 70% to about 80%, or from about 75% to about 80%, As mentioned above, the material, which may be an inorganic layer, on walls of the honeycomb body is very thin compared to thickness of the base portion of the walls of the honeycomb body. As will be discussed in further detail below, the material, which may be an inorganic layer, on the honeycomb body can be formed by methods that permit the layer to be applied to surfaces of walls of the honeycomb body in very thin layers. In embodiments, the average thickness of the material, which may be an inorganic layer, on the base portion of the walls of the honeycomb body is greater than or equal to 0.5 µm and less than or equal to 50 µm, or greater than or equal to 0.5 µm and less than or equal to 45 µm, greater than or equal to 0.5 µm and less than or equal to 40 µm, or greater than or equal to 0.5 µm and less than or equal to 35 µm, or greater than or equal to 0.5 µm and less than or equal to 30 µm, greater than or equal to 0.5 µm and less than or equal to 25 µm, or greater than or equal to 0.5 µm and less than or equal to 20 µm, or greater than or equal to 0.5 µm and less than or equal to 15 µm, greater than or equal to 0.5 µm and less than or equal to 10 µm.

As discussed above, the material, which may be an inorganic layer, can be applied to the walls of the honeycomb body by methods that permit the inorganic material, which may be an inorganic layer, to have a small mean pore size. This small mean pore size allows the material, which may be an inorganic layer, to filter a high percentage of particulate and prevents particulate from penetrating honeycomb and settling into the pores of the honeycomb, as described above with reference to FIG. 4. The small mean pore size of material, which may be an inorganic layer, according to embodiments increases the filtration efficiency of the honeycomb body. In one or more embodiments, the material, which may be an inorganic layer, on the walls of the honeycomb body has a mean pore size from greater than or equal to 0.1 µm to less than or equal to 5 µm, such as from greater than or equal to 0.5 µm to less than or equal to 4 µm, or from greater than or equal to 0.6 µm to less than or equal to 3 µm. For example, in some embodiments, the material, which may be an inorganic layer, on the walls of the honeycomb body may have mean pore sizes of about 0.5 µm, about 0.6 µm, about 0.7 µm, about 0.8 µm, about 0.9 µm, about 1 µm, about 2 µm, about 3 µm, or about 4 µm.

Although the material, which may be an inorganic layer, on the walls of the honeycomb body may, in embodiments, cover substantially 100% of the wall surfaces defining inner channels of the honeycomb body, in other embodiments, the material, which may be an inorganic layer, on the walls of the honeycomb body covers less than substantially 100% of the wall surfaces defining inner channels of the honeycomb body. For instance, in one or more embodiments, the material, which may be an inorganic layer, on the walls of the honeycomb body covers at least 70% of the wall surfaces defining inner channels of the honeycomb body, covers at least 75% of the wall surfaces defining inner channels of the honeycomb body, covers at least 80% of the wall surfaces defining inner channels of the honeycomb body, covers at least 85% of the wall surfaces defining inner channels of the honeycomb body, covers at least 90% of the wall surfaces defining inner channels of the honeycomb body, or covers at least 85% of the wall surfaces defining inner channels of the honeycomb body.

As described above with reference to FIGS. 2 and 3, the honeycomb body can have a first end and second end. The first end and the second end are separated by an axial length. In some embodiments, the layer on the walls of the honeycomb body may extend the entire axial length of the honeycomb body (i.e., extends along 100% of the axial length). However, in other embodiments, the material, which may be an inorganic layer, on the walls of the honeycomb body extends along at least 60% of the axial length, such as extends along at least 65% of the axial length, extends along at least 70% of the axial length, extends along at least 75% of the axial length, extends along at least 80% of the axial length, extends along at least 85% of the axial length, extends along at least 90% of the axial length, or extends along at least 95% of the axial length.

In embodiments, the material, which may be an inorganic layer, on the walls of the honeycomb body extends from the first end of the honeycomb body to the second end of the honeycomb body. In some embodiments, the material, which may be an inorganic layer, on the walls of the honeycomb body extends the entire distance from the first surface of the honeycomb body to the second surface of the honeycomb body (i.e., extends along 100% of a distance from the first surface of the honeycomb body to the second surface of the honeycomb body). However, in one or more embodiments, the layer or material, which may be an inorganic layer, on the walls of the honeycomb body extends along 60% of a distance between the first surface of the honeycomb body and the second surface of the honeycomb body, such as extends along 65% of a distance between the first surface of the honeycomb body and the second surface of the honeycomb body, extends along 70% of a distance between the first surface of the honeycomb body and the second surface of the honeycomb body, extends along 75% of a distance between the first surface of the honeycomb body and the second surface of the honeycomb body, extends along 80% of a distance between the first surface of the honeycomb body and the second surface of the honeycomb body, extends along 85% of a distance between the first surface of the honeycomb body and the second surface of the honeycomb body, extends along 90% of a distance between the first surface of the honeycomb body and the second surface of the honeycomb body, or extends along 95% of a distance between the first surface of the honeycomb body and the second surface of the honeycomb body.

As stated above, and without being bound by any particular theory, it is believed that a low pressure drop is achieved by honeycomb bodies of embodiments because the material, which may be an inorganic layer, on the honeycomb body is a primary filtration component of the honeycomb body, which allows for more flexibility in designing a honeycomb body. The selection of a honeycomb body having a low pressure drop in combination with the low thickness and porosity of the layer on the honeycomb body according to embodiments allows a honeycomb body of embodiments to have a low pressure drop when compared to conventional honeycomb bodies. In embodiments, the layer is between 0.3 to 30 g/L on the honeycomb body, such as between 1 to 30 g/L on the honeycomb body, or between 3 to 30 g/L on the honeycomb body. In other embodiments, the layer is between 1 to 20 g/l on the honeycomb body, such as between 1 to 10 g/l on the honeycomb body. In some embodiments, the pressure drop (i.e., a clean pressure drop without soot or ash) across the honeycomb body compared to a honeycomb without a thin porous inorganic material, which may be an inorganic layer, is less than or equal to 20%, such as less than or equal to 9%, or less than or equal to 8%. In other embodiments, the pressure drop across the honeycomb body is less than or equal to 7%, such as less than or equal to 6%. In still other embodiments, the pressure drop across the honeycomb body is less than or equal to 5%, such as less than or equal to 4%, or less than or equal to 3%.

As stated above, and without being bound to any particular theory, small pore sizes in the layer on the walls of the honeycomb body allow the honeycomb body to have good filtration efficiency even before ash or soot build-up occurs in the honeycomb body. The filtration efficiency of honeycomb bodies is measured herein using the protocol outlined in Tandon et al., 65 CHEMICAL ENGINEERING SCI- ENCE 4751-60 (2010). As used herein, the initial filtration efficiency of a honeycomb body refers to a new or regenerated honeycomb body that does not comprise any measurable soot loading. In embodiments, the initial filtration efficiency (i.e., clean filtration efficiency) of the honeycomb body is greater than or equal to 70%, such as greater than or equal to 80%, or greater than or equal to 85%. In yet other embodiments, the initial filtration efficiency of the honeycomb body is greater than 90%, such as greater than or equal to 93%, or greater than or equal to 95%, or greater than or equal to 98%.

The material, which may be an inorganic layer, on the walls of the honeycomb body according to embodiments is thin and has a porosity, and in some embodiments the layer on walls of the honeycomb body also has good chemical durability and physical stability. The chemical durability and physical stability of the material, which may be an inorganic layer, on the honeycomb body can be determined, in embodiments, by subjecting the honeycomb body to test cycles comprising burn out cycles and an aging test and measuring the initial filtration efficiency before and after the test cycles. For instance, one exemplary method for measuring the chemical durability and the physical stability of the honeycomb body comprises measuring the initial filtration efficiency of a honeycomb body; loading soot onto the honeycomb body under simulated operating conditions; burning out the built up soot at about 650° C.; subjecting the honeycomb body to an aging test at 1050° C. and 10% humidity for 12 hours; and measuring the filtration efficiency of the honeycomb body. Multiple soot build up and burnout cycles may be conducted. A small change in filtration efficiency ($\Delta FE$) from before the test cycles to after the test cycles indicates better chemical durability and physical stability of the material, which may be an inorganic layer, on the honeycomb body. In some embodiments, the $\Delta FE$ is less than or equal to 5%, such as less than or equal to 4%, or less than or equal to 3%. In other embodiments, the $\Delta FE$ is less than or equal to 2%, or less than or equal to 1%.

In some embodiments, the material, which may be an inorganic layer, on the walls of the honeycomb body may be comprised of one or a mixture of ceramic components, such as, for example, ceramic components selected from the group consisting of $SiO_2$, $Al_2O_3$, MgO, $ZrO_2$, CaO, $TiO_2$, $CeO_2$, $Na_2O$, Pt, Pd, Ag, Cu, Fe, Ni, and mixtures thereof. Thus, the material, which may be an inorganic layer, on the walls of the honeycomb body may comprise an oxide ceramic.

As discussed in more detail below, the method for forming the material, which may be an inorganic layer, on the honeycomb body according to embodiments can allow for customization of the layer composition for a given application. This may be beneficial because the ceramic components may be combined to match, for example, the physical properties—such as, for example coefficient of thermal expansion (CTE) and Young's modulus, etc.—of the honeycomb body, which can improve the physical stability of the honeycomb body. In some embodiments, the material, which may be an inorganic layer, on the walls of the honeycomb body may comprise cordierite, aluminum titanate, enstatite, mullite, forsterite, corundum (SiC), spinel, sapphirine, and periclase.

In some embodiments, the composition of the material, which may be an inorganic layer, on the walls of the honeycomb body is the same as the composition of the honeycomb body. However, in other embodiments, the composition of the layer is different from the composition of the honeycomb body.

The properties of the material, which may be an inorganic layer, and, in turn, the honeycomb body overall are attributable to the ability of applying a thin, porous material, which may be an inorganic layer, having small median pore sizes to a honeycomb body.

In some embodiments, the method of forming a honeycomb body comprises forming or obtaining an aerosol that comprises a ceramic precursor material and a solvent. The ceramic precursor material of the layer precursor comprises conventional raw ceramic materials that serve as a source of, for example, $SiO_2$, $Al_2O_3$, $TiO_2$, MgO, $ZrO_2$, CaO, $CeO_2$, $Na_2O$, Pt, Pd, Ag, Cu, Fe, Ni, and the like.

In one or more embodiments, the aerosol, which is well-dispersed in a fluid, is directed to a honeycomb body, and the aerosol is deposited on the honeycomb body. In some embodiments, the honeycomb body may have one or more of the channels plugged on one end, such as, for example, the first end 105 of the honeycomb body during the deposition of the aerosol to the honeycomb body. The plugged channels may, in some embodiments, be removed after deposition of the aerosol. But, in other embodiments, the channels may remain plugged even after deposition of the aerosol. The pattern of plugging channels of the honeycomb body is not limited, and in some embodiments all the channels of the honeycomb body may be plugged at one end. In other embodiments, only a portion of the channels of the honeycomb body may be plugged at one end. In such embodiments, the pattern of plugged and unplugged channels at one end of the honeycomb body is not limited and may be, for example, a checkerboard pattern where alternating channels of one end of the honeycomb body are plugged. By plugging all or a portion of the channels at one end of the honeycomb body during deposition of the aerosol, the aerosol may be evenly distributed within the channels 110 of the honeycomb body 100.

Embodiments of honeycomb bodies and methods for forming the same as disclosed and described herein are now provided.

According to one or more embodiments, binders with high temperature (e.g., greater than 400° C.) resistance are included in the material, which may be an inorganic layer, to enhance integrity of the material, which may be an inorganic layer, at high temperatures encountered in automobile exhaust gas emissions treatment systems. In specific embodiments, a material, which may be an inorganic layer, comprising about 5 wt % Dowsil™ US-CF-2405, an alkoxysiloxane resin. The microstructure of the material, which may be an inorganic layer, was similar to the as-deposited morphology after the various tests described below. The inorganic binders Aremco Ceramabind™ 644A and 830 are also used in in one or more embodiments of the material, which may be an inorganic layer. The filtration efficiency of both samples are higher than 60% after the high flow blowing test, a high flow test at 850 $Nm^3/h$. The tests demonstrated that the binders, including organic and inorganic binders, caused the primary particles to bind together to form secondary aggregate particles (also called agglomerates), which were bound to the filter walls, even when exposed to high temperatures encountered in engine exhaust gas streams. According to one or more embodiments, other potential inorganic and organic binders such as silicate (e.g. $Na_2SiO_3$), phosphate (e.g. $AlPO_4$, $AlH_2(PO_4)_3$), hydraulic cement (e.g. calcium aluminate), sol (e.g. $mSiO_2 \cdot nH_2O$, $Al(OH)_x \cdot (H_2O)_{6-x}$) and metal alkoxides, could also be utilized in this material, which may be an inorganic layer, to increase the material, which may be an inorganic layer, mechanical strength by an appropriate curing process.

The disclosure includes the following numbered embodiments:

1. A honeycomb body comprising:
   a porous ceramic honeycomb structure comprising a first end, a second end, and a plurality of walls having porous wall surfaces defining a plurality of inner channels, the porous wall surfaces comprising wall pores having a mean wall pore size $d_{50}$ of a bulk of the honeycomb body and the pores having a $d_{10}$ value above which the pore sizes of 90% of the pores lie and below which the pore sizes of the remaining 10% of the pores lie; and
   a porous material disposed on one or more of the wall surfaces, wherein the porous inorganic material comprises primary particle and agglomerates,
   wherein the honeycomb body comprises a property selected from the group of:
   a. a ratio of agglomerate mean size $D_{50}$ to mean wall pore size of the bulk of the honeycomb body $d_{50}$ in a range of from 5:1 to 16:1;
   b. a ratio of agglomerate mean size $D_{50}$ to a wall pore size of the bulk honeycomb body $d_{10}$ in a range of from 6:1 to 20:1;
   c. primary particles that are non-spherical and agglomerates that are spherical;
   d. 75% of the primary particles have a circularity of less than 0.8 and agglomerates have a circularity greater than 0.9;
   e. the porous material comprising inorganic particles and a binder; and
   f. the porous material extending from the first end to the second end, wherein the porous material comprises discrete, disconnected patches of filtration material.

2. The honeycomb body of embodiment 1, wherein the porous inorganic material comprises a layer which has an average thickness greater than about 0.5 μm and less than or equal to 50 μm.

3. The honeycomb body of embodiment 1 or 2, wherein the porous inorganic material comprises a layer which has an average thickness of greater than or equal to 0.5 μm and less than or equal to 25 μm.

4. The honeycomb body of any of embodiments 1-3, wherein the porous inorganic material comprises an oxide ceramic.

5 The honeycomb body of any of embodiments 1-4, wherein the porous inorganic material covers at least 70% of the wall surfaces.

6. The honeycomb body of any of embodiments 1-5, wherein the porous inorganic material covers at least 90% of the wall surfaces.

7 The honeycomb body of any of embodiments 1-6, wherein the first end and the second end are spaced apart by an axial length, and the porous inorganic material covers at least 60% along the axial length.

8. The honeycomb body of any of embodiments 1-7, wherein the porous honeycomb body has a bulk porosity from greater than or equal to 50% to less than or equal to 70%.

9. The honeycomb body of embodiment 1, wherein a porous ceramic honeycomb structure has a bulk mean pore size greater than or equal to 10 μm.

10. The honeycomb body of any of embodiments 1-9, wherein the porous ceramic honeycomb structure has a bulk mean pore size greater than or equal to 15 μm.

11. The honeycomb body of any of embodiments 1-10, wherein the porous ceramic honeycomb structure has a bulk mean pore size from greater than or equal to 8 μm to less than or equal to 25 μm.

12. The honeycomb body of any of embodiments 1-11, wherein the porous ceramic honeycomb structure has a surface porosity greater than or equal to 35%.

13. The honeycomb body of any of embodiments 1-12, wherein the porous ceramic honeycomb structure has a surface porosity greater than or equal to 40%.

14. The honeycomb body of any of embodiments 1-13, wherein the porous ceramic honeycomb structure has a surface porosity from greater than or equal to 35% to less than or equal to 60%.

15. The honeycomb body of any of embodiments 1-14, wherein the porous ceramic honeycomb structure has a surface mean pore size greater than or equal to 8 μm.

16. The honeycomb body of any of embodiments 1-15, wherein the porous ceramic honeycomb structure has a surface mean pore size greater than or equal to 10 μm.

17. The honeycomb body of any of embodiments 1-16 wherein the porous a porous ceramic honeycomb structure has a surface mean pore size from greater than or equal to 8 μm to less than or equal to 20 μm.

18. The honeycomb body of any of embodiments 1-17, wherein the porosity of the porous inorganic material is from about 20% to about 95%.

19. The honeycomb body of any of embodiments 1-18, wherein the porosity of the porous inorganic material is in a range from about 25% to about 95%.

20. A method for forming a honeycomb body, comprising:
   contacting an inorganic material in a suspension with a gaseous carrier fluid;
   depositing the inorganic material on a ceramic honeycomb body by flowing the gaseous carrier fluid to the ceramic honeycomb body; and
   binding the inorganic material to the ceramic honeycomb body to form a porous inorganic material,
   wherein the porous inorganic material comprises primary particles and agglomerates,
   wherein the ceramic honeycomb body comprises a porous ceramic honeycomb structure comprising a first end, a second end, and a plurality of walls having porous wall surfaces defining a plurality of inner channels, the porous wall surfaces comprising wall pores having a mean wall pore size $d_{50}$ of a bulk of the honeycomb body and the pores having a $d_{10}$ value above which the pore sizes of 90% of the pores lie and below which the pore sizes of the remaining 10% of the pores lie; and
   wherein the honeycomb body comprises a property selected from the group of:
   a. a ratio of agglomerate mean size $D_{50}$ to mean wall pore size of the bulk of the honeycomb body $d_{50}$ in a range of from 5:1 to 16:1;
   b. a ratio of agglomerate mean size $D_{50}$ to wall pore size of the bulk honeycomb body $d_{10}$ in a range of from 6:1 to 20:1;
   c. primary particles that are non-spherical and agglomerates that are spherical;
   d. 75% of the primary particles have a circularity of less than 0.8 and agglomerates have a circularity greater than 0.9;
   e. the porous material comprising inorganic particles and a binder; and
   f. the porous material extending from the first end to the second end, wherein the porous material comprises discrete, disconnected patches of filtration material.

21. The method of embodiment 20, wherein the porous inorganic material comprises a layer which has an average thickness greater than about 0.5 μm and less than or equal to 50 μm.

22. The method of embodiment 20 or 21, wherein the porous inorganic material comprises a layer which has an average thickness of greater than or equal to 0.5 μm and less than or equal to 25 μm.

23. The method of any of embodiments 20-22, wherein the porous inorganic material comprises an oxide ceramic.

24. The method of any of embodiments 20-23, wherein the inorganic material comprises a ceramic material.

25. The method for forming the honeycomb body of any of embodiments 20-24, wherein the inorganic material is in a suspension with a solvent.

26. The method for forming the honeycomb body of embodiment 25, wherein the solvent is selected from the group consisting of methoxyethanol, ethanol, water, xylene. methanol, ethylacetate, benzene, and mixtures thereof.

27. The method for forming the honeycomb body of any of embodiments 20-26, further comprising atomizing the suspension in a nozzle.

28. The method for forming the honeycomb body of any of embodiments 20-27, wherein the binding of the inorganic material to the ceramic honeycomb body comprises including a binder in the suspension.

EXAMPLES

Embodiments will be further understood by the following non-limiting examples.

Examples 1-7

A process flow was followed as shown in FIG. 5. A suspension (30 wt. % solids) of 150 nm average primary particle size $Al_2O_3$ (Beijing Dk Nano technology Co. Ltd.) was formed in ethanol and was stirred for 1 hour before preparing the diluted suspension to prevent the sedimentation of $Al_2O_3$ primary particles. The raw material components and contents for Examples 1-7 are listed in Table 2. For Example 1, the raw suspension was directly diluted to be 11 wt. % solids in ethanol (AR, Sinopharm Group Co. Ltd.)

A two-phase fluid nozzle (1/4 J-SS+SU11-SS, Spraying systems Co.) was used to form droplets during the atomizing step. A schematic diagram of the deposition process was shown in FIG. 6A. For Examples 1-3, atomization was achieved by the pressure control system. The pressure was supplied by a $N_2$ gas cylinder and adjusted by pressure regulator. Atomizing gas was supplied by a nitrogen supply cylinder and with pressure maintained at 116 psi, while the mixing suspension was delivered by high pressure nitrogen from a separate pipeline maintained at a pressure of 78 psi. For Examples 4-7, atomization was achieved by flow rate control system using a mass flow controller and the liquid flow rate was controlled by a syringe pump. The atomizing gas was also supplied by the nitrogen cylinder, but it was controlled by the flow rate instead of pressure. The atomizing gas flow rate was fixed at 20 L/min. The mixing suspension was delivered by the injector pump and the liquid injecting rate was fixed at 1.4 ml/min.

In the drying step, the air flow was heated by the heating bands (resistance heaters) in the areas H, H1 and H2 which was marked red in FIG. 6. The temperatures of H1 and H2 were set at 350° C. and 200° C., while the temperature of H was set at 350° C. The atomizing droplets were dried in the hot air flow and formed the secondary aggregate particles before the inlet of honeycomb filters. The diameter and length of honeycomb filters used in Examples 1-7 were 4.055 inches and 5.47 inches. The CPSI and wall thickness were 200 and 8 mils. In the depositing step, the flow was driven by a fan in the pressure control system, and a pump in the flow rate control system. The secondary aggregate particles were carried by the flow and deposited under the wall of the honeycomb filters to form the material, which may be an inorganic layer. In the curing step, the curing temperature and time are listed in the Table 2 for Examples 2-7.

TABLE 2

| | Mixing solution | | | | Curing process | |
|---|---|---|---|---|---|---|
| Example No. | 150 nm $Al_2O_3$ suspension (solid contents %) | Binder | Content (wt. % vs. $Al_2O_3$) | Catalyst | Content (wt. % vs. binder) | Curing temperature (° C.) | Curing time (h) |
| 1 | 11% | — | — | — | — | — | — |
| 2 | 11% | 2405 | 5% | — | — | 40 | 48 |
| 3 | 11% | 2405 | 5% | Titanium butoxide | 1% | Room temperature | 4 |
| 4 | 11% | 2405 | 5% | — | — | 40 | 48 |
| 5 | 11% | 2403 | 5% | — | — | 40 | 12 |
| 6 | 11% | 644A | 5% | — | — | 40 | 12 |
| 7 | 11% | 830 | 5% | — | — | 40 | 12 |

To evaluate robustness of the material, which may be an inorganic layer, Examples 1-7 were subjected to a high flow blowing test. The test flow rate was as high as 850 Nm³/h, which was much higher than the vehicle exhaust flow rate. The total test time was about 10 mins and the highest flow lasted for 1 min. The FE and pressure drop (dP) at 1.7 m/s velocity were measured after the high flow blowing and listed in Table 3.

TABLE 3

| Example No. | As-deposited | | After high flow test | |
|---|---|---|---|---|
| | FE % | dP(Pa) | FE % | dP(Pa) |
| 1 | | | | |
| 2 | 76.85% | 197 | 74.1% | 187 |
| 3 | 73.64% | 193 | 70.66% | 191 |
| 4 | 83.82% | 205 | 84.85% | 198 |
| 5 | 82.87% | 193 | 80.56% | 193 |
| 6 | 83.52% | 197 | 60.34% | 182 |
| 7 | 76.63% | 198 | 59.44% | 180 |

FE of Examples 2-5 was considered to be at a stable value within measurement error ranges. Although the FE of Examples 6 and 7 decreased about 1/4 after the high flow test, they were still at 60% level. For Comparative Example 1 without binder, the FE reduced much more than that of material, which may be an inorganic layer, with binder examples. The Examples demonstrate that binders enhanced the material, which may be an inorganic layer, strength. Example 3 utilized a curing catalyst, and curing time was shortened to 4 hours at room temperature. However, other binder systems required a curing time of at least 12 hours, and the curing temperature was at 40° C. For Example 3, there was only a 3% FE drop after the high flow test, which was the same as Example 2. Thus, a small amount of an appropriate catalyst could obviously accelerate curing speed and not affect the strength of the material.

Figure 8A:
FIG. 8A is an SEM photograph of a honeycomb body comprising material formed on a wall at 10% depth from the inlet wall surface.
Figure 8B:
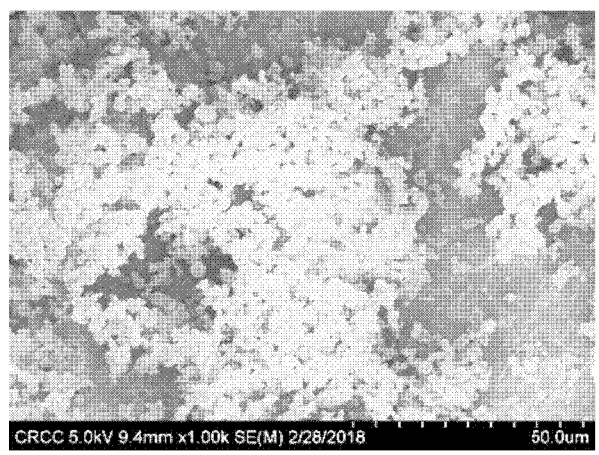
FIG. 8B is an SEM photograph of a honeycomb body comprising a material formed on a wall at 50% depth from the inlet wall surface.
Figure 8C:
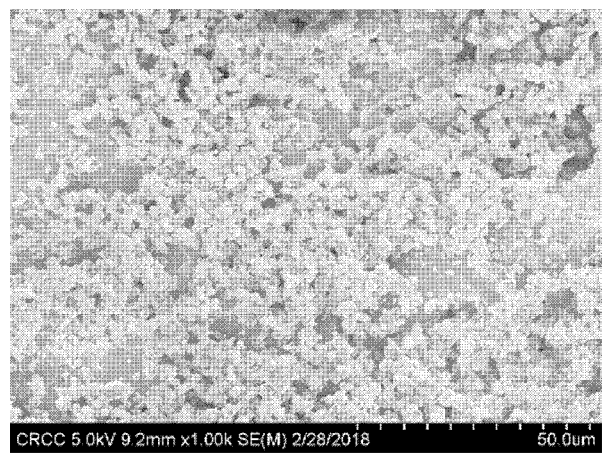
FIG. 8C is an SEM photograph of a honeycomb body comprising a material formed on a wall at 90% depth from the inlet wall surface.
Figure 8D:
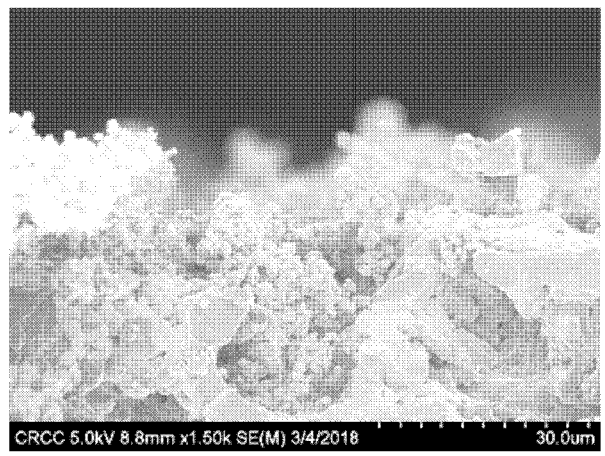
FIG. 8D is an SEM photograph of a cross-section of a honeycomb body comprising a material formed on a wall at 10% depth from the inlet wall surface.
Figure 8E:
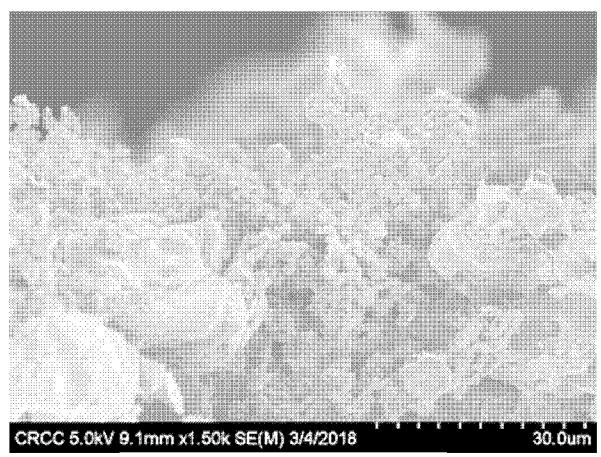
FIG. 8E is SEM photograph of a cross-section of a honeycomb body comprising a material formed on a wall at 50% depth from the inlet wall surface.
Figure 8F:
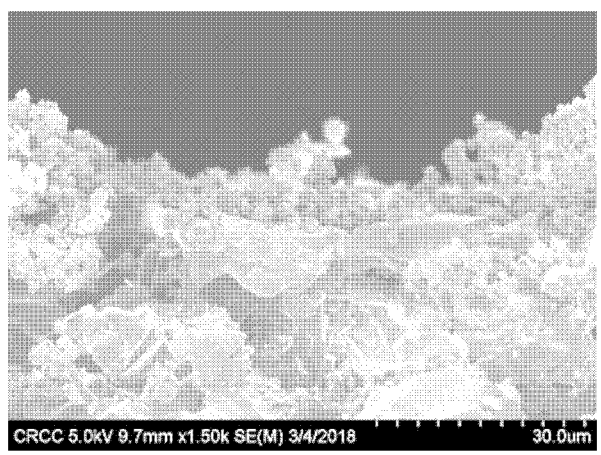
FIG. 8F is SEM photograph of a cross-section of a honeycomb body comprising a material formed on a wall at 90% depth from the inlet wall surface.

FIGS. 8A-F are SEM photographs showing morphology of the filter wall surface at different depth from filter inlets. FIG. 8A shows 10% depth for Example 2. FIG. 8B shows 50% depth for Example 2. FIG. 8C shows 90% depth of Example 2. FIG. 8D shows 10% depth of Example 7. FIG. 8E shows 50% depth of Example 7. FIG. 8F shows 90% depth of Example 7.

FIGS. 8A-F show the morphologies at different depths from Examples 2 and 7 inlets after high flow tests. The material was not a continuous layer but that the particles filled the open pores under the surface of the filters. According to one or more embodiments, the material, which may be an inorganic layer, provided herein comprises a discontinuous layer formed from the inlet end to the outlet end comprising discrete and disconnected patches of material and binder comprised of primary particles in secondary aggregate particles or agglomerates that are substantially spherical. In one or more embodiments, the primary particles are non-spherical. In one or more embodiments, "substantially spherical" refers to an agglomerate having a roundness factor in cross section in a range of from about 0.8 to about 1 or from about 0.9 to about 1, with 1 representing a perfect circle.

With increasing the depth from the filter inlets, the material became thicker and thicker. Comparing microstructures of Examples 2 and 7, the material comprising Dowsil™ US-CF-2405 exhibited better adhesion than the high temperature inorganic binder 830. The particles existed in the surface pores contributed to the remaining FE after high flow blowing. The material morphologies were in accordance with FE measurements results.

To further validate the mechanical strength of the material with a binder system, various tests was performed with Example 4. After the high flow test, the filter was sealed in a can and then installed in the vehicle exhaust pipe (GEELY EmgrandGT, 1.8T GDI). The vehicle was run on the highway for about 1 hour. The filter was calcined in a muffle furnace at 650° C. for 5 hours to remove the soot after the vehicle test.

A vibration test (76 g, 200 Hz, 2 h) was performed, by fixing the canned filter in a metal box and then installed on a vibration bed. The vibration acceleration was up to 76 g acceleration, and the vibration frequency was 200 Hz. The canned filter was vibrated in the horizontal direction for 1 hour and then in the vertical direction for another 1 hour. The filter was treated at 1150° C. for 0.5 hour.

The tests were performed in the following order: high flow test, canning, first vehicle test, first vibration test, second vibration test, extreme thermal treatment and second vehicle test. The FE and dP was measured after each test. The FE results were maintained above 75% and the total largest variation was only 7%. After the first vehicle test, the material with binder was subjected to 650° C. calcination for 5 hours, but the filtration efficiency was reduced by only 5%. This result showed that binder 2405 and the material integrity were stable at high temperatures according to the tests, which is in the range of the normal temperature of the vehicle exhaust. The filtration efficiency and pressure drop did not change during two continuous vibration tests. The results indicated that the binder improved material mechanical integrity in various tests to simulate actual use and an actual vehicle test. As for the high temperature treatment, only 2% filtration drop was observed. The results demonstrated the thermal robustness of the material. Overall, a material with appropriate binders could obtain the advanced material mechanical strength to pass various conditions, such as high flow blowing, over gravitational acceleration vibration, high temperature treatment and real vehicle engine exhaust treatment.

Figure 13A:
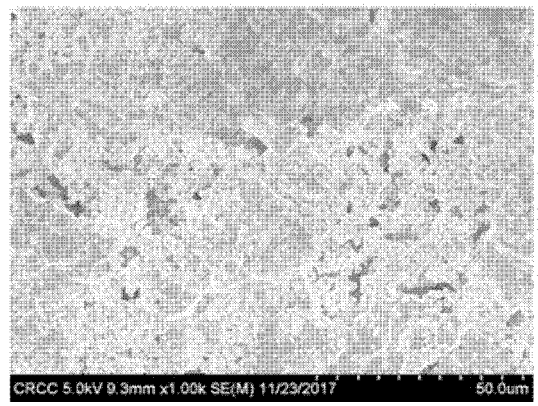
FIG. 13A is an SEM photograph of a honeycomb body comprising a material formed on a wall of Example 4 after the tests described in the Examples at 10% depth from the inlet wall surface.
Figure 13B:
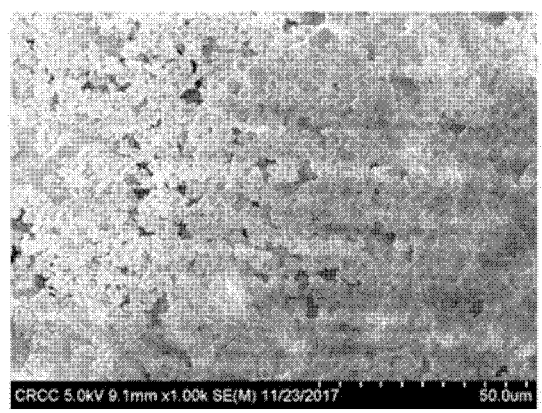
FIG. 13B is an SEM photograph of a honeycomb body comprising a material formed on a wall of Example 4 after the tests described in the Examples at 50% depth from the inlet wall surface.
Figure 13C:
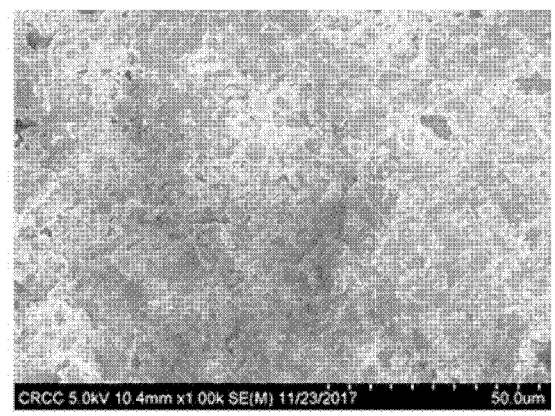
FIG. 13C is an SEM photograph of a honeycomb body comprising a material formed on a wall of Example 4 after the tests described in the Examples at 90% depth from the inlet wall surface.

After the various condition tests, the material of Example 4 was examined with a scanning electron microscope, and the microstructure of the material after use is shown in FIGS. 13A-C. As can be seen from FIGS. 13A-C, the material distribution on the wall is substantially similar to that of Examples 2 and 7. With the increasing the depth from filter inlets, the material became thicker. All the open pores under the surface were filled by the particles, which led to the high filtration efficiency of filters. The Examples demonstrated that the usage of high temperature binder was an effective way to build a stable material structure.

Circularity Measurements

Figure 14A:
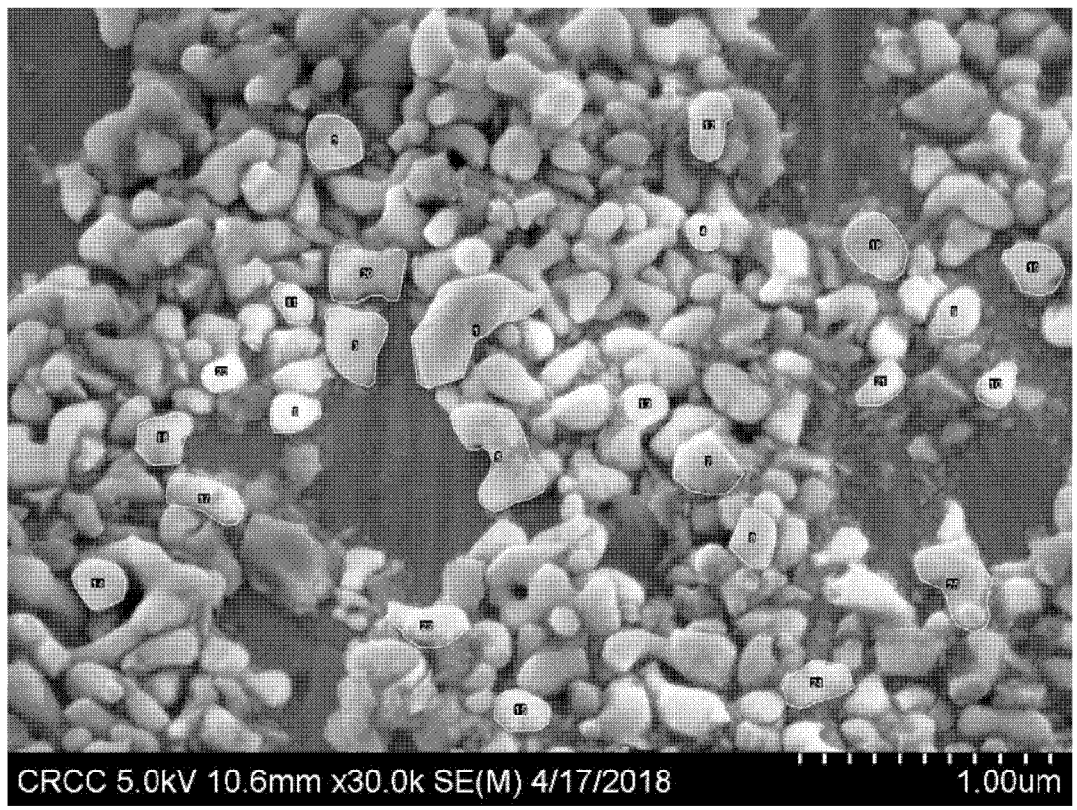
FIG. 14A is an SEM photograph of primary particles measured for circularity.

A sample made similar to Examples 2-7 was examined using a scanning electron microscope. Primary particles and aggregate particles (agglomerates) were measured for circularity. FIG. 14A shows primary particles measured by SEM. The measured primary particles were selected randomly from the individual particles. FIG. 14B provides a tabulation of the measured data of 25 particles.

Figure 15A:
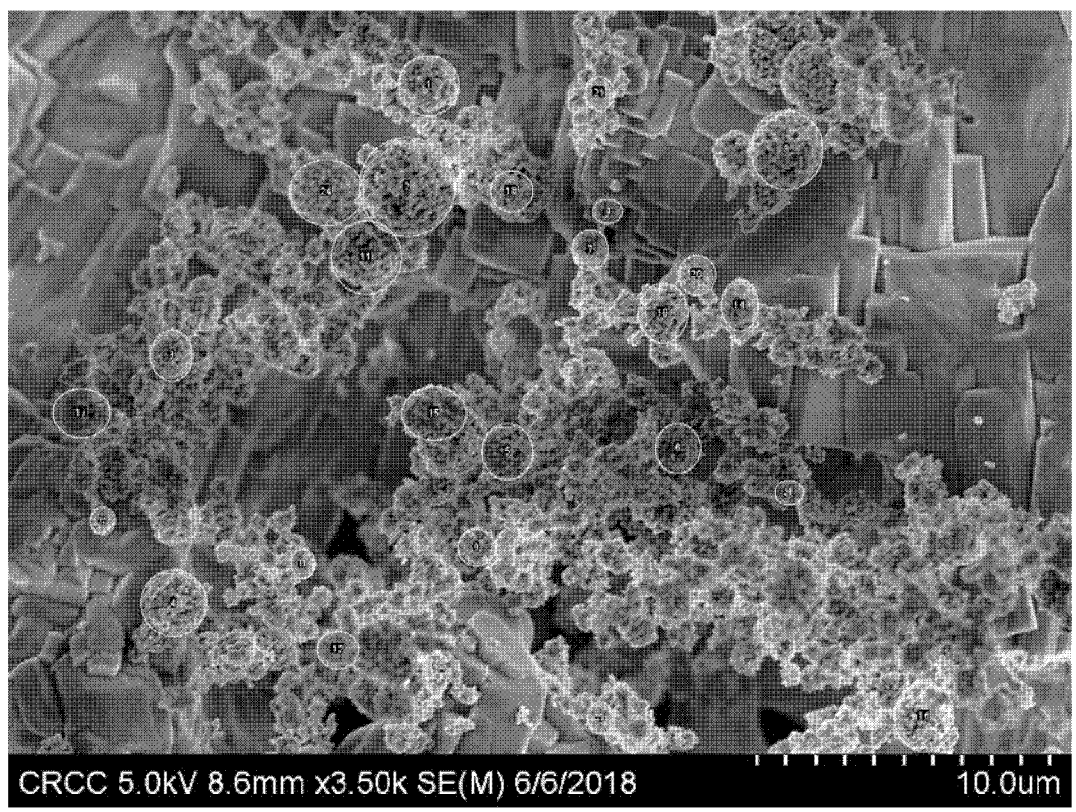
FIG. 15A is an SEM photograph of agglomerates measured for circularity.

The agglomerates that were measured are shown in the SEM photograph of FIG. 15A. The measured agglomerates were selected randomly. FIG. 15B provides a tabulation of the measured data of 25 agglomerates.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A honeycomb body comprising:
a porous ceramic honeycomb structure comprising a first end, a second end, and a plurality of walls having porous wall surfaces defining a plurality of inner channels, the porous wall surfaces comprising wall pores having a mean wall pore size $d_{50}$ of a bulk of the honeycomb body and the wall pores having a $d_{10}$ value above which the wall pore sizes of 90% of the pores lie and below which the wall pore sizes of the remaining 10% of the pores lie; and
a porous inorganic material disposed on one or more of the porous wall surfaces, wherein the porous inorganic material comprises primary particles and agglomerates thereof, wherein the agglomerates comprise an average diameter of 300 nm to 8 micrometers,
wherein the porous inorganic material extends from the first end to the second end, and the porous inorganic material comprises discrete, disconnected patches of filtration material.

2. The honeycomb body of claim 1, wherein the porous inorganic material comprises a layer which has an average thickness greater than about 0.5 μm and less than or equal to 50 μm.

3. The honeycomb body of claim 1, wherein the porous inorganic material comprises an oxide ceramic.

4. The honeycomb body of claim 1, wherein the porous inorganic material covers at least 70% of the wall surfaces.

5. The honeycomb body of claim 1, wherein the porous inorganic material covers at least 90% of the wall surfaces.

6. The honeycomb body of claim 1, wherein the first end and the second end are spaced apart by an axial length, and the porous inorganic material covers at least 60% along the axial length.

7. The honeycomb body of claim 1, wherein the porous honeycomb body has a bulk porosity from greater than or equal to 50% to less than or equal to 70%.

8. The honeycomb body of claim 1, wherein the porous ceramic honeycomb structure has a bulk mean pore size greater than or equal to 10 μm.

9. The honeycomb body of claim 1, wherein the porous ceramic honeycomb structure has a bulk mean pore size greater than or equal to 15 μm.

10. The honeycomb body of claim 1, wherein the porous ceramic honeycomb structure has a bulk mean pore size from greater than or equal to 8 μm to less than or equal to 25 μm.

11. The honeycomb body of claim 1, wherein the porous ceramic honeycomb structure has a surface porosity greater than or equal to 35%.

12. The honeycomb body of claim 1, wherein the porous ceramic honeycomb structure has a surface porosity from greater than or equal to 35% to less than or equal to 60%.

13. The honeycomb body of claim 1, wherein the porous ceramic honeycomb structure has a surface mean pore size greater than or equal to 8 μm.

14. The honeycomb body of claim 1, wherein the porous ceramic honeycomb structure has a surface mean pore size from greater than or equal to 8 μm to less than or equal to 20 μm.

15. The honeycomb body of claim 1, wherein the porosity of the porous inorganic material is from about 20% to about 95%.

16. The honeycomb body of claim 1 wherein the agglomerates are porous.

17. The honeycomb body of claim 1 wherein the agglomerates are substantially spherical.

18. The honeycomb body of claim 1 wherein the agglomerates comprise an average diameter of 300 nm to 3 micrometers.

19. The honeycomb body of claim 18 wherein the agglomerates comprise an average diameter of 300 nm to 3 micrometers, and a ratio of the average diameter of the agglomerates to an average diameter of the primary particles is in range of from about 2:1 to about 10:1.

* * * * *